United States Patent
Zhu

(10) Patent No.: US 12,082,190 B2
(45) Date of Patent: Sep. 3, 2024

(54) INFORMATION TRANSMISSION METHOD AND APPARATUS, AND BASE STATION AND TERMINAL

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 598 days.

(21) Appl. No.: 17/290,693

(22) PCT Filed: Nov. 1, 2018

(86) PCT No.: PCT/CN2018/113522
§ 371 (c)(1),
(2) Date: Apr. 30, 2021

(87) PCT Pub. No.: WO2020/087464
PCT Pub. Date: May 7, 2020

(65) Prior Publication Data
US 2022/0022226 A1 Jan. 20, 2022

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0003* (2013.01); *H04W 72/0446* (2013.01); *H04W 72/0453* (2013.01); *H04W 72/23* (2023.01)

(58) Field of Classification Search
CPC .. H04L 1/0003; H04L 5/003; H04W 72/0446; H04W 72/0453; H04W 72/1273; H04W 72/23
See application file for complete search history.

(56) References Cited

U.S. PATENT DOCUMENTS

2016/0095018 A1 3/2016 Vajapeyam et al.
2016/0309451 A1 10/2016 Ye et al.
(Continued)

FOREIGN PATENT DOCUMENTS

CN 105323049 A 2/2016
CN 106993332 A 7/2017
(Continued)

OTHER PUBLICATIONS

Supplementary European Search Report in the European Application No. 18938780.6, dated May 11, 2022, (9p).
(Continued)

*Primary Examiner* — Nizam U Ahmed
(74) *Attorney, Agent, or Firm* — Arch & Lake LLP

(57) ABSTRACT

Provided are a method and apparatus for transmitting information, a base station and a terminal. The method includes: determining transmission configuration information of a transmission region based on a preset size of a data block after channel detection on an unlicensed spectrum succeeds, the transmission region bearing downlink data transmission; generating a scheduling instruction according to the transmission configuration information, and transmitting it to a target terminal; and performing the downlink data transmission according to the transmission configuration information based on the preset size of the data block. The method for transmitting the information provided by the present disclosure may effectively transmit information with an unlicensed spectrum resource, and improve the reliability of information transmission of the unlicensed spectrum.

17 Claims, 14 Drawing Sheets

(51) Int. Cl.
  *H04W 72/0446* (2023.01)
  *H04W 72/0453* (2023.01)
  *H04W 72/23* (2023.01)

(56) References Cited

U.S. PATENT DOCUMENTS

| | | |
|---|---|---|
| 2017/0064704 A1 | 3/2017 | Seo |
| 2017/0231004 A1 | 8/2017 | Babaei et al. |
| 2017/0318565 A1 | 11/2017 | Golitschek Edler von Elbwart et al. |
| 2017/0353277 A1* | 12/2017 | Baker ............... H04L 5/001 |
| 2018/0035406 A1 | 2/2018 | Hao |
| 2019/0394802 A1 | 12/2019 | Karaki et al. |
| 2020/0196342 A1* | 6/2020 | Lin ................ H04L 5/0048 |

FOREIGN PATENT DOCUMENTS

| | | |
|---|---|---|
| CN | 107079496 A | 8/2017 |
| CN | 107409381 A | 11/2017 |
| CN | 108289335 A | 7/2018 |
| CN | 108370573 A | 8/2018 |
| WO | 2016069144 A1 | 5/2016 |
| WO | 2018126363 A1 | 7/2018 |
| WO | 2018185641 A1 | 10/2018 |

OTHER PUBLICATIONS

English translation of the Written Opinion of the International Search Authority in the international application No. PCT/CN2018/113522, dated Jul. 30, 2019, (4p).

Qualcomm, NTT DOCOMO, "Way Forward on UCI transmission on eLAA SCells", 3GPP TSG RAN WG1 #85 R1-165922, Busan, Korea, May 23-27, 2016,(3p).

LG Electronics, "Remaining issues on PUSCH transmission in LAA", 3GPP TSG RAN WG1 Meeting #86 R1-166814, Gothenburg, Sweden, Aug. 22-26, 2016; Agenda Item: 7.2.1.1,(5p).

International Search Report of PCT Application No. PCT/CN2018/113522 dated Jul. 30, 2019 with English translation (4p).

Ericsson, "Msg2 TBS Determination for BL/CE UE", 3GPP TSG-RAN1 Meeting #86, R1-167855, Aug. 26, 2016, (3p).

First Office Action of the European application No. 18938780.6, issued on Jan. 16, 2024, 7 pages.

* cited by examiner

INFORMATION TRANSMISSION METHOD AND APPARATUS, AND BASE STATION AND TERMINAL

CROSS REFERENCE TO RELATED APPLICATION

This application is the national phase application of International Application No. PCT/CN2018/113522, filed on Nov. 1, 2018, the entire contents of which are incorporated herein by reference for all purposes.

TECHNICAL FIELD

The present disclosure relates to the technical field of communications, and more particularly, to a method and apparatus for transmitting information, a base station and a terminal.

BACKGROUND

Mobile communication networks have been gradually evolved to 5th-Generation (5G) New Radio (NR) systems, many new frequency resources have been correspondingly used in mobile communication systems for information transmission. One feature of the new mobile communication systems such as 5G NR is the use of high frequency spectrums. Another feature of the new mobile communication systems for developing new spectrums is the massive use of unlicensed spectrums such as 2.4 GHz and 5 GHz for information transmission.

When working in an unlicensed spectrum, both a base station and a terminal also need to follow a channel detection mechanism such as a Listen Before Talk (LBT) detection mechanism used in a Wireless Fidelity (WiFi) system because there is a need for the base station and the terminal to compete with the WiFi system and other systems for an unlicensed spectrum resource. Regarding the channel detection mechanism, in wireless communication systems, when an information transmitting terminal needs to transmit information to an information receiving terminal through an unlicensed spectrum resource, idle channel detection may be first performed at the unlicensed spectrum, so as to determine whether an available resource exists at present. Hence, a base station has uncertain channel occupation when transmitting the information at the unlicensed spectrum. In a case where the base station continues a resource scheduling manner of a licensed spectrum when transmitting the information through the unlicensed spectrum resource, i.e., the base station indicates data transmission on subsequent one or more transmission units through one scheduling signaling, the scheduled resource may be occupied by devices of other systems such as a WiFi system and thus data cannot be transmitted, thereby affecting the data transmission.

SUMMARY

In order to overcome the problems in related art, the embodiments of the present disclosure provide a method and apparatus for transmitting information, a base station and a terminal. By configuring a data block of a fixed size and corresponding transmission configuration information, the present disclosure effectively transmits information with an unlicensed spectrum resource, and improves the reliability of information transmission of the unlicensed spectrum.

According to a first aspect of the present disclosure, a method for transmitting information is provided, which may be implemented by a base station and include that:
  transmission configuration information of a transmission region is determined based on a preset size of a data block after channel detection on an unlicensed spectrum succeeds, the transmission region being a region bearing downlink data transmission;
  a scheduling instruction is generated according to the transmission configuration information, and transmitted to a target terminal; and
  the downlink data transmission is performed according to the transmission configuration information based on the preset size of the data block.

Optionally, the operation that the transmission configuration information of the transmission region is determined based on the preset size of the data block may include that:
  a target time-domain resource range bearing the data block is determined;
  a target frequency-domain resource range bearing the data block is determined;
  Modulation and Coding Scheme (MCS) information of the transmission region is determined according to the target time-domain resource range, the target frequency-domain resource range and the preset size of the data block; and
  the transmission configuration information of the transmission region is determined according to the target time-domain resource range, the target frequency-domain resource range and the MCS information.

Optionally, the operation that the target time-domain resource range bearing the data block is determined may include that:
  the target time-domain resource range is determined according to preset time-domain resource configuration information.

Optionally, the preset time-domain resource configuration information is first preset time-domain resource configuration information, the first preset time-domain resource configuration information indicating that the base station determines the preset number of time-domain resource units as time-domain resources of the transmission region after the channel detection succeeds.

The operation that the target time-domain resource range is determined according to the preset time-domain resource configuration information may include that:
  the target time-domain resource range is determined according to the preset number of time-domain resource units after the channel detection succeeds.

Optionally, the preset time-domain resource configuration information is second preset time-domain resource configuration information, the second preset time-domain resource configuration information indicating that the base station determines at least one preset remaining time-domain resource in a present data transmission unit where the channel detection succeeds and a preset range of time-domain resources in a subsequent data transmission unit as target time-domain resources of the transmission region.

The operation that the target time-domain resource range is determined according to the preset time-domain resource configuration information may include that:
  according to the second preset time-domain resource configuration information and according to a time-domain position at which the channel detection succeeds, at least one remaining time-domain resource of the present data transmission unit where the time-domain position is located are determined; and the target time-domain resource range is determined according to the at least one remaining time-domain resource and the preset range of time-domain resources in the subsequent data transmission unit.

Optionally, the operation that the scheduling instruction is generated according to the transmission configuration information may include that:

the scheduling instruction is generated according to the target time-domain resource range, the target frequency-domain resource range and the MCS information of the transmission region.

Optionally, the operation that the scheduling instruction is generated according to the transmission configuration information may include that:

the scheduling instruction is generated according to information of a time-domain position at which the channel detection succeeds, the target frequency-domain resource range and the MCS information of the transmission region.

Optionally, the operation that the scheduling instruction is generated according to the transmission configuration information may include that:

whether the transmission configuration information is as same as preset configuration information of the data block is determined, the preset configuration information of the data block including: a preset time-domain resource quantity, a preset frequency-domain resource quantity and preset MCS information;

when the transmission configuration information is different from the preset configuration information of the data block, preset indication information for indicating that the transmission configuration information is different from the preset configuration information of the data block is determined; and the scheduling instruction is determined according to the preset configuration information of the data block, the preset indication information and the information of the time-domain position at which the channel detection succeeds.

Optionally, the operation that the scheduling instruction is determined according to the preset configuration information of the data block, the preset indication information and the information of the time-domain position at which the channel detection succeeds may include that:

a preset information field is determined, the preset information field being configured to bear indication information representing whether the transmission configuration information of the transmission region is as same as the preset configuration information of the data block; and the scheduling instruction is generated by loading the preset indication information to the preset information field and carrying the preset configuration information of the data block and the information of the time-domain position at which the channel detection succeeds.

Optionally, the scheduling instruction may carry the preset configuration information of the data block and the information of the time-domain position at which the channel detection succeeds.

The operation that the scheduling instruction is transmitted to the target terminal may include that:

preset transmission characteristic information of the scheduling instruction is determined, the preset transmission characteristic information being configured to represent the preset indication information; and the scheduling instruction is transmitted to the target terminal according to the preset transmission characteristic information.

According to a second aspect of the present disclosure, a method for transmitting information is provided, which may be implemented by a terminal and include that:

a target scheduling instruction transmitted by a base station for a transmission region of an unlicensed spectrum is received, the target scheduling instruction being a scheduling instruction generated by transmission configuration information that is determined by a base station based on a preset size of a data block; and downlink data transmitted by the base station according to the preset size of the data block is acquired according to the target scheduling instruction.

Optionally, the operation that the downlink data transmitted by the base station according to the preset size of the data block is acquired according to the target scheduling instruction may include that:

a time-frequency range and MCS information of the transmission region are determined according to the target scheduling instruction; and the downlink data transmitted by the base station according to the preset size of the data block is acquired according to the time-frequency range and the MCS information of the transmission region.

Optionally, the target scheduling instruction may include: information of a time-domain position at which channel detection succeeds, a target frequency-domain resource range of the transmission region and the MCS information of the transmission region.

The operation that the time-frequency range and the MCS information of the transmission region are determined according to the target scheduling instruction may include that:

a time-domain resource range of the transmission region is determined according to first preset time-domain resource configuration information and the information of the time-domain position at which the channel detection succeeds, the first preset time-domain resource configuration information indicating that a preset number of time-domain resource units after the channel detection succeeds are determined as target time-domain resources bearing the data block; and the time-frequency range and the MCS information of the transmission region are determined according to the time-domain resource range, the target frequency-domain resource range and the MCS information of the transmission region.

Optionally, the target scheduling instruction at least may include: preset configuration information of the data block and information of a time-domain position at which channel detection succeeds. The preset configuration information of the data block may include: a preset time-domain resource quantity, a preset frequency-domain resource quantity and preset MCS information.

The operation that the time-frequency range and the MCS information of the transmission region are determined according to the target scheduling instruction may include that:

whether a preset information field is set in the target scheduling instruction is determined, the preset information field indicating whether the transmission configuration information of the transmission region is as same as the preset configuration information of the data block; and when the preset information field is set in the target scheduling instruction, the time-frequency range and the MCS information of the transmission region are determined according to preset indication information carried by the preset information field.

Optionally, the operation that the time-frequency range and the MCS information of the transmission region are determined according to the preset indication information carried by the preset information field may include that:

when the preset information field carries first preset indication information, a time-domain resource range of the transmission region is determined according to the information of the time-domain position at which the channel detection succeeds and the preset time-domain resource quantity of the data block, the first preset indication information indicating that the transmission configuration information of the transmission region is as same as the preset configuration information of the data block;

a frequency-domain resource range of the transmission region is determined according to the preset frequency-domain resource quantity of the data block and working frequency information of the terminal; and the preset MCS information of the data block is determined as the MCS information of the transmission region.

Optionally, the operation that the time-frequency range and the MCS information of the transmission region are determined according to the preset indication information carried by the preset information field may include that:

when the preset information field carries second preset indication information, a time-domain resource range of the transmission region is determined according to the information of the time-domain position at which the channel detection succeeds and second preset time-domain resource configuration information; and the MCS information of the transmission region is determined according to the time-domain resource range of the transmission region, a working frequency range of the terminal at the unlicensed spectrum and the preset configuration information of the data block.

The second preset indication information indicates that the transmission configuration information of the transmission region is different from the preset configuration information of the data block; and the second preset time-domain resource configuration information indicates that the base station determines at least one preset remaining time-domain resource in a present data transmission unit where the channel detection succeeds and a preset range of time-domain resources in a subsequent data transmission unit as target time-domain resources bearing the transmission region.

Optionally, the target scheduling instruction at least may include: preset configuration information of the data block and information of a time-domain position at which channel detection succeeds. The preset configuration information of the data block may include: a preset time-domain resource quantity, a preset frequency-domain resource quantity and preset MCS information.

The operation that the time-frequency range and the MCS information of the transmission region are determined according to the target scheduling instruction may include that:

whether transmission information of the target scheduling instruction includes preset transmission characteristic information is determined, the preset transmission characteristic information indicating that the transmission configuration information of the transmission region is different from the preset configuration information of the data block;

when the transmission information of the target scheduling instruction includes the preset transmission characteristic information, a time-domain resource range of the transmission region is determined according to the information of the time-domain position at which the channel detection succeeds and second preset time-domain resource configuration information; and the MCS information of the transmission region is determined according to the time-domain resource range of the transmission region, a working frequency range of the terminal at the unlicensed spectrum and the preset configuration information of the data block.

The second preset time-domain resource configuration information indicates that the base station determines at least one preset remaining time-domain resource in a present data transmission unit where the channel detection succeeds and a preset range of time-domain resources in a subsequent data transmission unit as target time-domain resources of the transmission region.

Optionally, the preset transmission characteristic information may include at least one of followings:
a preset transmission position;
a preset Downlink Control Information (DCI) format;
a preset Radio Network Temporary Identity (RNTI); and
a preset scrambling sequence.

According to a third aspect of the present disclosure, an apparatus for transmitting information is provided, which may be disposed in a base station and include that:

a configuration module, configured to determine transmission configuration information of a transmission region based on a preset size of a data block after channel detection on an unlicensed spectrum succeeds, the transmission region being a region bearing downlink data transmission;

a scheduling instruction generation module, configured to generate a scheduling instruction according to the transmission configuration information, and transmit the scheduling instruction to a target terminal; and a transmission module, configured to perform the downlink data transmission according to the transmission configuration information based on the preset size of the data block.

Optionally, the configuration module may include:
a time-domain determination submodule, configured to determine a target time-domain resource range bearing the data block;
a frequency-domain determination submodule, configured to determine a target frequency-domain resource range bearing the data block;
an MCS determination submodule, configured to determine MCS information of the transmission region according to the target time-domain resource range, the target frequency-domain resource range and the preset size of the data block; and
a configuration information determination submodule, configured to determine the transmission configuration information of the transmission region according to the target time-domain resource range, the target frequency-domain resource range and the MCS information.

Optionally, the time-domain determination submodule is configured to determine the target time-domain resource range according to preset time-domain resource configuration information.

Optionally, the preset time-domain resource configuration information is first preset time-domain resource configuration information, the first preset time-domain resource configuration information indicating that the base station determines a preset number of time-domain resource units as time-domain resources of the transmission region after the channel detection succeeds.

The time-domain determination submodule is configured to determine the target time-domain resource range according to the preset number of time-domain resource units after the channel detection succeeds.

Optionally, the preset time-domain resource configuration information is second preset time-domain resource configuration information, the second preset time-domain resource configuration information indicating that the base station determines at least one preset remaining time-domain resource in a present data transmission unit where the channel detection succeeds and a preset range of time-domain resources in a subsequent data transmission unit as target time-domain resources of the transmission region.

The time-domain determination submodule may include:
a remaining time-domain determination unit, configured to determine, according to the second preset time-domain resource configuration information and according to a time-domain position at which the channel detection succeeds, at least one remaining time-domain resource of the present data transmission unit where the time-domain position is located; and
a time-domain resource determination unit, configured to determine the target time-domain resource range according to the at least one remaining time-domain resource and the preset range of time-domain resources in the subsequent data transmission unit.

Optionally, the scheduling instruction generation module is configured to generate the scheduling instruction according to the target time-domain resource range, the target frequency-domain resource range and the MCS information of the transmission region.

Optionally, the scheduling instruction generation module is configured to generate the scheduling instruction according to information of a time-domain position at which the channel detection succeeds, the target frequency-domain resource range and the MCS information of the transmission region.

Optionally, the scheduling instruction generation module may include:
a determination submodule, configured to determine whether the transmission configuration information is as same as preset configuration information of the data block. The preset configuration information of the data block may include: a preset time-domain resource quantity, a preset frequency-domain resource quantity and preset MCS information;
an indication information determination submodule, configured to determine, when the transmission configuration information is different from the preset configuration information of the data block, preset indication information for indicating that the transmission configuration information is different from the preset configuration information of the data block; and
a scheduling instruction determination submodule, configured to determine the scheduling instruction according to the preset configuration information of the data block, the preset indication information and information of a time-domain position at which the channel detection succeeds.

Optionally, the scheduling instruction generation submodule may include:
an information field determination unit, configured to determine a preset information field, the preset information field being configured to bear indication information representing whether the transmission configuration information of the transmission region is as same as the preset configuration information of the data block; and
an instruction generation unit, configured to generate the scheduling instruction by loading the preset indication information to the preset information field, and carrying the preset configuration information of the data block and the information of the time-domain position at which the channel detection succeeds.

Optionally, the scheduling instruction may carry the preset configuration information of the data block and the information of the time-domain position at which the channel detection succeeds.

The scheduling instruction generation module may include:
a transmission characteristic determination submodule, configured to determine preset transmission characteristic information of the scheduling instruction, the preset transmission characteristic information being configured to represent the preset indication information; and
an instruction transmitting submodule, configured to transmit the scheduling instruction to the target terminal according to the preset transmission characteristic information.

According to a fourth aspect of the present disclosure, an apparatus for transmitting information is provided, which may be disposed in a terminal and include that:
a receiving module, configured to receive a target scheduling instruction transmitted by a base station for a transmission region of an unlicensed spectrum, the target scheduling instruction being a scheduling instruction generated by transmission configuration information that is determined by the base station based on a preset size of a data block; and
a data acquisition module, configured to acquire, according to the target scheduling instruction, downlink data transmitted by the base station according to the preset size of the data block.

Optionally, the data acquisition module may include:
a transmission information determination submodule, configured to determine a time-frequency range and MCS information of the transmission region according to the target scheduling instruction; and
a data acquisition submodule, configured to acquire, according to the time-frequency range and the MCS information of the transmission region, the downlink data transmitted by the base station according to the preset size of the data block.

Optionally, the target scheduling instruction may include: information of a time-domain position at which channel detection succeeds, a target frequency-domain resource range of the transmission region and the MCS information of the transmission region.

The transmission information determination submodule may include:
a first time-domain determination unit, configured to determine a time-domain resource range of the transmission region according to first preset time-domain resource configuration information and the information of the time-domain position at which the channel detection succeeds, the first preset time-domain resource configuration information indicating that after the channel detection succeeds, the preset number of time-domain resource units are determined as target time-domain resources bearing the data block; and a first transmission information determination unit, configured to determine the time-frequency range and the MCS information of the transmission region according to the time-domain resource range, the target frequency-domain resource range and the MCS information.

Optionally, the target scheduling instruction at least may include: preset configuration information of the data block and information of a time-domain position at which channel detection succeeds. The preset configuration information of the data block may include: a preset time-domain resource quantity, a preset frequency-domain resource quantity and preset MCS information.

The transmission information determination submodule may include:

an information field determination unit, configured to determine whether a preset information field is set in the target scheduling instruction, the preset information field indicating whether the transmission configuration information of the transmission region is as same as the preset configuration information of the data block; and a transmission information determination unit, configured to determine, when the preset information field is set in the target scheduling instruction, the time-frequency range and the MCS information of the transmission region according to preset indication information carried by the preset information field.

Optionally, the transmission information determination unit may include:

a first time-domain determination subunit, configured to determine, when the preset information field carries first preset indication information, a time-domain resource range of the transmission region according to the information of the time-domain position at which the channel detection succeeds and the preset time-domain resource quantity of the data block, the first preset indication information indicating that the transmission configuration information of the transmission region is as same as the preset configuration information of the data block;

a frequency-domain determination subunit, configured to determine a frequency-domain resource range of the transmission region according to the preset frequency-domain resource quantity of the data block and working frequency information of the terminal; and a first MCS determination subunit, configured to determine the preset MCS information of the data block as the MCS information of the transmission region.

Optionally, the transmission information determination unit may include:

a second time-domain determination subunit, configured to determine, when the preset information field carries second preset indication information, a time-domain resource range of the transmission region according to the information of the time-domain position at which the channel detection succeeds and second preset time-domain resource configuration information; and a second MCS determination subunit, configured to determine the MCS information of the transmission region according to the time-domain resource range of the transmission region, a working frequency range of the terminal at the unlicensed spectrum and the preset configuration information of the data block.

The second preset indication information indicates that the transmission configuration information of the transmission region is different from the preset configuration information of the data block; and the second preset time-domain resource configuration information indicates that the base station determines at least one preset remaining time-domain resource in a present data transmission unit where the channel detection succeeds and a preset range of time-domain resources in a subsequent data transmission unit as target time-domain resources bearing the transmission region.

Optionally, the target scheduling instruction at least may include: preset configuration information of the data block and information of a time-domain position at which channel detection succeeds. The preset configuration information of the data block may include: a preset time-domain resource quantity, a preset frequency-domain resource quantity and preset MCS information.

The transmission information determination submodule may include:

a transmission characteristic determination unit, configured to determine whether transmission information of the target scheduling instruction includes preset transmission characteristic information, the preset transmission characteristic information indicating that the transmission configuration information of the transmission region is different from the preset configuration information of the data block;

a time-domain determination unit, configured to determine, if the transmission information of the target scheduling instruction includes the preset transmission characteristic information, a time-domain resource range of the transmission region according to the information of the time-domain position at which the channel detection succeeds and second preset time-domain resource configuration information; and an MCS determination unit, configured to determine the MCS information of the transmission region according to the time-domain resource range of the transmission region, a working frequency range of the terminal at the unlicensed spectrum and the preset configuration information of the data block.

The second preset time-domain resource configuration information indicates that the base station determines at least one preset remaining time-domain resource in a present data transmission unit where the channel detection succeeds and a preset range of time-domain resources in a subsequent data transmission unit as target time-domain resources of the transmission region.

Optionally, the preset transmission characteristic information may include at least one of followings:

a preset transmission position;
a preset DCI format;
a preset RNTI; and
a preset scrambling sequence.

According to a fifth aspect of the present disclosure, a non-transitory computer-readable storage medium is provided, which stores computer instructions thereon. The instructions may be executed by a processor to implement any operation of the method in the first aspect.

According to a sixth aspect of the present disclosure, a non-transitory computer-readable storage medium is provided, which stores computer instructions thereon. The instructions may be executed by a processor to implement any operation of the method in the second aspect.

According to a seventh aspect of the present disclosure, a base station is provided, which may include:
 a processor; and
 memory storing instructions executable by the processor. The processor is configured to:
  determine transmission configuration information of a transmission region based on a preset size of a data block after channel detection on an unlicensed spectrum succeeds, the transmission region being a region bearing downlink data transmission;
  generate a scheduling instruction according to the transmission configuration information, and transmit the scheduling instruction to a target terminal; and
  perform the downlink data transmission according to the transmission configuration information based on the preset size of the data block.

According to an eighth aspect of the present disclosure, User Equipment (UE) is provided, which may include:
 a processor; and
 memory storing instructions executable by the processor. The processor is configured to:
  receive a target scheduling instruction transmitted by a base station for a transmission region of an unlicensed spectrum, the target scheduling instruction being a scheduling instruction generated by transmission configuration information that is determined by the base station based on a preset size of a data block; and
  acquire, according to the target scheduling instruction, downlink data transmitted by the base station according to the preset size of the data block. The technical solutions provided by the embodiments of the present disclosure may have the following beneficial effects.

In the embodiments of the present disclosure, a base station may perform transmission configuration on a transmission region based on a preset size of a data block after channel detection succeeds, generate a scheduling instruction based on transmission configuration information of the transmission region, and transmit the scheduling instruction to a target terminal. The target terminal may receive and analyze downlink data transmission bearing the preset size of the data block. In the present disclosure, the base station adapts to an idle channel resource of an unlicensed spectrum through the preset size of the data block, and may adaptively configure the transmission configuration information of the transmission region, such that a data volume born on the configured transmission region is equal to a data volume born on a preset data block. Hence, the base station may effectively reduce the transmission unreliability caused by uncertainty of an unlicensed spectrum resource in related art. Therefore, the method for transmitting information provided by the present disclosure may effectively transmit information with an unlicensed spectrum resource, and improve the reliability of information transmission of the unlicensed spectrum.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 3-1 to FIG. 3-4 are a schematic diagram of an application scenario for transmitting information according to an exemplary embodiment.

FIG. 4 is a flowchart of another method for transmitting information according to an exemplary embodiment.

DETAILED DESCRIPTION

Figure 1:
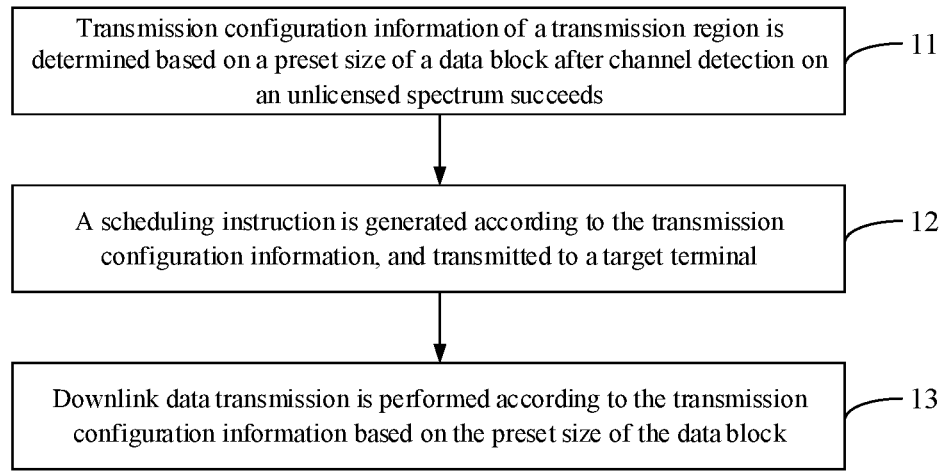
FIG. 1 is a flowchart of a method for transmitting information according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the present disclosure, the information should not be limited to these terms. These terms are only adopted to distinguish the information of the same type. For example, without departing from the scope of the present disclosure, first information may also be called second information and, and similarly, second information may also be called first information. For example, the term "if" used here may be explained as "while" or "when" or "responsive to determining", which depends on the context.

Execution bodies involved in the present disclosure include: a base station and User Equipment (UE) in mobile communication networks such as 4th-Generation (4G) Long Term Evolution (LTE), LTE-NR interworking and 5G NR. The base station may be a base station provided with a large-scale antenna array, a secondary base station, etc. The UE may be a user terminal, a user node, a mobile terminal or a tablet or the like. During specific implementation, a base station and UE may be independent from each other or may be mutually connected, to jointly carry out the technical solutions provided in the present disclosure.

The application scenario of the present disclosure is as below. A base station needs to generate a scheduling instruction after channel detection on an unlicensed spectrum succeeds, to notify the terminal of the size of the data block that is to be used by downlink data transmission as well as MCS information that is used during data transmission. Due to uncertain channel occupation on the unlicensed spectrum, the base station cannot determine which data block is adapted to the available resource. Herein, the data block indicates the size of a data packet used in information transmission as well as MCS information of the data packet.

In view of this, the present disclosure provides a method for transmitting information, which may be implemented by a base station. The method may include the following operations:

In Operation 11, transmission configuration information of a transmission region is determined based on a preset size of a data block after channel detection on an unlicensed spectrum succeeds, the transmission region being a region bearing downlink data transmission.

In the present disclosure, the transmission configuration information of the transmission region on the unlicensed spectrum is configured based on the preset size of the data block, such that the data volume that may be born on the configured transmission region is equal to the data volume that is born by the preset size of the data block.

In the present disclosure, the system may agree that after the channel detection performed by the base station on the unlicensed spectrum resource succeeds, the preset size of the data block may be used to perform the downlink data transmission. The preset size of the data block is represented by the following three parameters: a preset time-domain resource quantity T0, a preset frequency-domain resource quantity f0 and preset MCS information. In an example, it is assumed that the preset size of the data block is represented as: 10 symbols, 20 MHz, and Quadrature Phase Shift Keying (QPSK).

Figure 2:
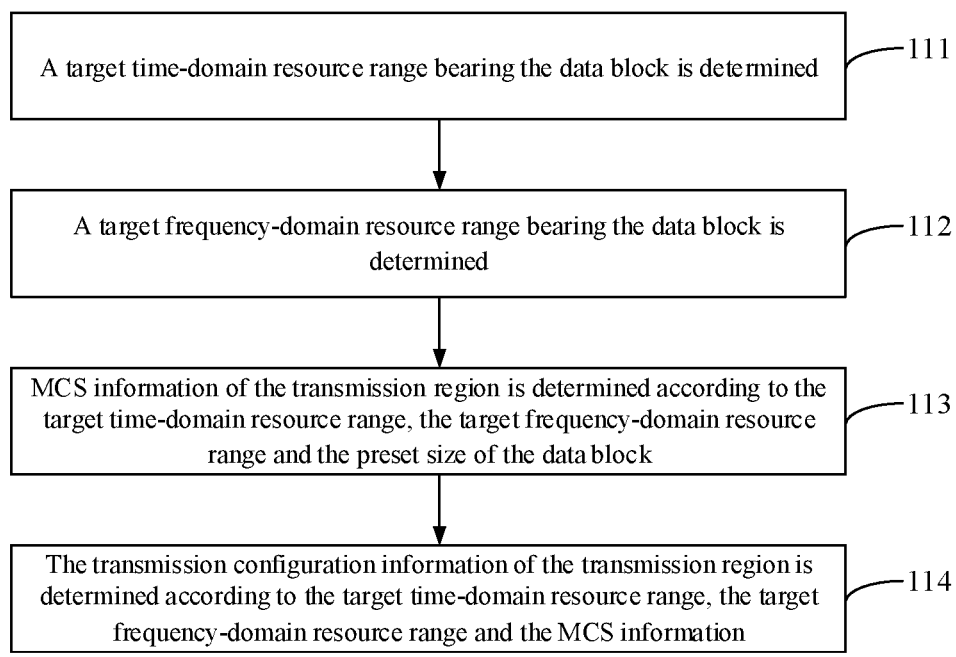
FIG. 2 is a flowchart of another method for transmitting information according to an exemplary embodiment.

FIG. 2 is a flowchart of another method for transmitting information according to an exemplary embodiment. The operation 11 may include the following operations.

In Operation 111, a target time-domain resource range bearing the data block is determined.

According to an embodiment of the present disclosure, the base station may randomly determine, according to a preset policy, the target time-domain resource range bearing the data block.

In another embodiment of the present disclosure, the base station may further determine, according to preset time-domain resource configuration information agreed by the system for the transmission region, the target time-domain resource range bearing the data block.

In the present disclosure, according to different preset time-domain resource configuration information, the implementation of operation 111 may include the following two cases:

In a first case, the preset time-domain resource configuration information is first preset time-domain resource configuration information. The first preset time-domain resource configuration information indicates that a preset number of time-domain resource units after the channel detection succeeds is determined as time-domain resources of the transmission region, i.e., target time-domain resources bearing the data block.

In an embodiment, the first preset time-domain resource configuration information may include: a preset time-domain resource quantity and start position indication information. The start position indication information is configured to determine a start time of the target time-domain resource. For example, the system may agree that a time-domain resource unit such as a symbol of a specified position after a time when the channel detection succeeds is determined as a start position of the target resource. The specified position may be a first position, a second position, etc.

Operation 111 may include that: the target time-domain resource range is determined according to the preset number of time-domain resource units after the channel detection succeeds.

Figures 1, 3:
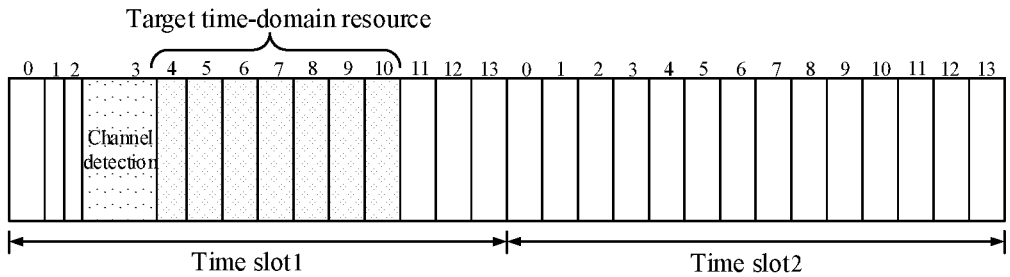
Figures 2, 3:
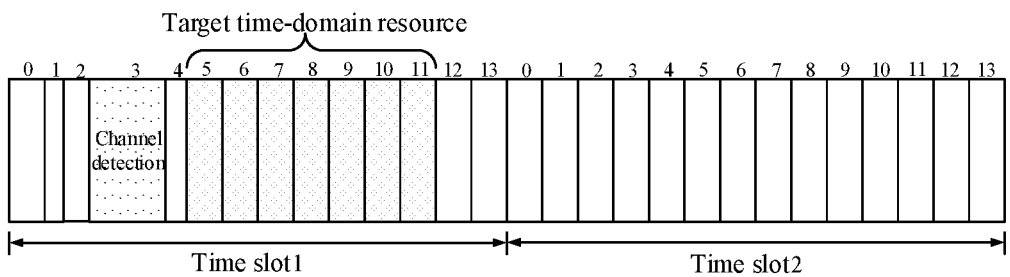
Figure 3:
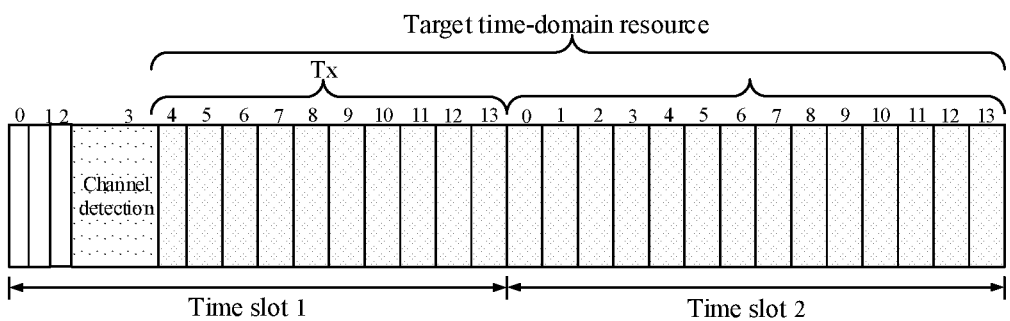

FIG. 3-1 is a schematic diagram of a scenario for transmitting information according to an exemplary embodiment. One data transmission unit is one slot. Each slot includes 14 symbols sequenced as: 0-13.

With the assumption that the preset time-domain resource quantity is 7 symbols, the start indication position of the transmission region is the first symbol after the channel detection succeeds. As shown in the figure, with the assumption that the channel detection of the base station on the 3th symbol of slot 1 succeeds, the 4th to 10th symbols of slot 1 are determined as the target time-domain resources according to the first preset time-domain resource configuration information. Similarly, if the channel detection of the base station on the 4th symbol of slot 1 succeeds, the 5th to 11th symbols are determined as the target time-domain resources according to the first preset time-domain resource configuration information.

By the same reasoning, in a situation where the start indication position is not next to a time-domain position where the channel detection succeeds, the time-domain resource range of the target time-domain resource may still be accurately determined according to the preset first time-domain configuration information. Referring to FIG. 3-2 that is a schematic diagram of another scenario for transmitting information according to an exemplary embodiment, the preset time-domain resource quantity is still 7 symbols, and the start indication position of the transmission region is the second symbol after the channel detection succeeds. If the channel detection of the base station on the 3th symbol of slot 1 succeeds, the 5th to 11th symbols are determined as the target time-domain resources according to the first preset time-domain resource configuration information.

In a second case, the preset time-domain resource configuration information is second preset time-domain resource configuration information. The second preset time-domain resource configuration information indicates that the base station determines at least one preset remaining time-domain resource in a present data transmission unit where the channel detection succeeds and a preset range of time-domain resources in a subsequent data transmission unit as target time-domain resources bearing the data block.

In an embodiment of the present disclosure, the system may agree that the base station determines, after the channel detection succeeds, at least one preset remaining time-domain resource Tx in the data transmission unit when the channel detection succeeds and at least one subsequent complete data transmission unit as the target time-domain resources bearing the preset size of the data block.

In another embodiment of the present disclosure, the preset range of time-domain resources in the subsequent data transmission unit may also be time-domain resources in a specified time-domain range of the subsequent data transmission unit, such as 0 to 6th symbols.

Figures 3, 4:
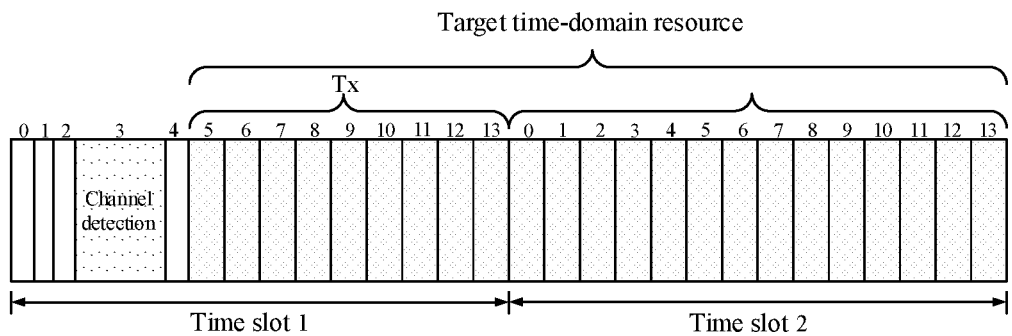
Figure 4:
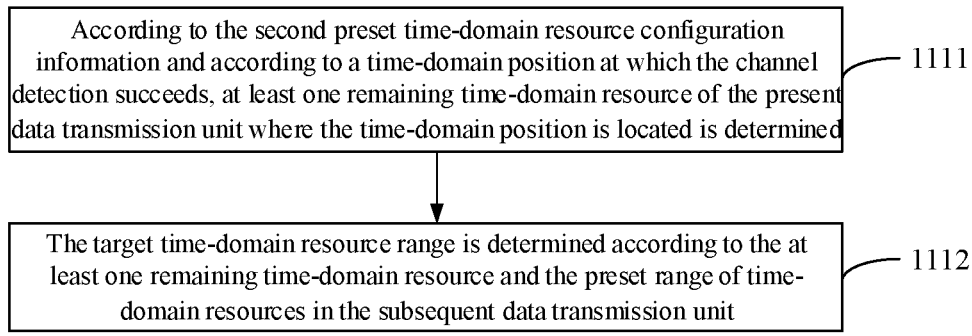

FIG. 4 is a flowchart of another method for transmitting information according to an exemplary embodiment. The operation 111 may include the following operations.

In Operation 1111, according to the second preset time-domain resource configuration information and according to a time-domain position at which the channel detection succeeds, at least one remaining time-domain resource of the present data transmission unit where the time-domain position is located is determined.

In Operation 1112, the target time-domain resource range is determined according to the at least one remaining time-domain resource and the preset range of time-domain resources in the subsequent data transmission unit.

FIG. 3-3 is a schematic diagram of another scenario for transmitting information according to an exemplary embodiment. Still with the assumption that the channel detection of the base station on the 3th symbol of slot 1 succeeds, if the start indication position of the transmission region indicated by the second preset time-domain configuration information is the first symbol after the channel detection succeeds, the 4th to 13th symbols of slot 1 and 14 symbols included in slot 2, 24 symbols in total are determined as the target time-domain resources, i.e., the time-domain resources bearing the data block, according to the second preset time-domain configuration information.

Similarly, the second time-domain resource configuration information may also indicate remaining time-domain resources in the present data transmission unit from the preset time-domain position after the channel detection succeeds.

FIG. 3-4 is a schematic diagram of another scenario for transmitting information according to an exemplary embodiment. With the assumption that the channel detection of the base station on the 3th symbol of slot 1 succeeds, if the start indication position of the transmission region indicated by the second preset time-domain configuration information is the second symbol after the channel detection succeeds, the 5th to 13th symbols of slot 1 and 14 symbols included in slot 2, 23 symbols in total are determined as the target time-domain resources according to the second preset time-domain configuration information.

In the embodiment of the present disclosure, when the base station determines the time-domain resources, i.e., the target time-domain resources, of the data block according to the second time-domain resource configuration information, the range of the target time-domain resources may change dynamically with the position where the channel detection succeeds.

In Operation 112, a target frequency-domain resource range bearing the data block is determined.

In the present disclosure, the base station may determine the frequency-domain resource range bearing the data block based on a capability that a radio-frequency device of the target terminal receives and transmits a signal of the unlicensed spectrum as well as presently detected idle channel information.

In Operation 113, MCS information of the transmission region is determined according to the target time-domain resource range, the target frequency-domain resource range and the preset size of the data block.

In a situation where the target time-domain resource range and the target frequency-domain resource range that bear the data block are determined, the MCS information used by the transmission region in actual transmission may be determined based on the preset size of the data block.

In an example, it is still assumed that the preset size of the data block is represented as: 10 symbols, 20 MHz, and QPSK. When the target time-domain resource quantity determined by the operation 111 is 7 symbols and the bandwidth of the target frequency-domain resource range determined by operation 112 is 20 MHz, since the target time-domain resource quantity is less than the preset time-domain resource quantity of the data block, the target MCS determined by the base station may be a modulation coding manner that has a higher order than the original MCS information, i.e., QPSK, such as 16 Quadrature Amplitude Modulation (QAM). The comparison between information of a preset data block and actual transmission configuration information may be as shown in Table 1:

TABLE 1

|  | Time-domain resource quantity | Frequency-domain resource quantity | MCS information |
|---|---|---|---|
| Preset data block | 10 symbols | 20 MHz | QPSK |
| Transmission region | 7 symbols | 20 MHz | 16 QAM |

Conversely, when the target time-domain resource quantity determined by operation 111 is 24 symbols and the size of the target frequency-domain resource determined by operation 112 is 20 MHz, since the target time-domain resource quantity is more than the preset time-domain resource quantity of the data block, the target MCS determined by the base station may be a modulation coding manner that has a lower order than original MCS information, i.e., QPSK, such as Binary Phase Shift Keying (BPSK). In the example, the comparison between information of a preset data block and actual transmission configuration information may be as shown in Table 2:

TABLE 2

|  | Time-domain resource quantity | Frequency-domain resource quantity | MCS information |
|---|---|---|---|
| Preset data block | 10 symbols | 20 MHz | QPSK |
| Transmission region | 24 symbols | 20 MHz | BPSK |

The above examples all take the case where a bandwidth of a target frequency-domain is equal to a size (20 MHz) of a preset frequency-domain of the data block as an example, and make the exemplary descriptions on how to determine the MCS information of the transmission region. It is to be understood that there is another case where the bandwidth of the target frequency-domain is not equal to the size of the preset frequency-domain of the data block. In this case, the MCS information of the transmission region that is determined by the base station may be as same as the preset MCS information of the data block, so the above examples should not be understood as limits to the present disclosure.

In Operation 114, the transmission configuration information of the transmission region is determined according to the target time-domain resource range, the target frequency-domain resource range and the MCS information.

In Operation 12, a scheduling instruction is generated according to the transmission configuration information and transmitted to a target terminal.

In the present disclosure, the scheduling instruction is configured to notify the target terminal of the time-frequency range of the transmission region and an MCS to be used in the downlink data transmission.

In the present disclosure, the base station may determine the scheduling instruction of the transmission region in at least one of the following manners:

In a first manner, the scheduling instruction may be directly generated according to the target time-domain resource range, the target frequency-domain resource range and the MCS information of the transmission region. Such a manner is particularly adaptive to the first implementation of the operation 11, i.e., the manner that the base station randomly determines the target time-domain resource range.

For the first manner, the terminal may directly acquire, according to the scheduling instruction, downlink data transmitted by the base station and corresponding to the size of the preset data block.

In a second manner, for a situation where the system agrees on the preset time-domain resource configuration information, the scheduling instruction may be generated according to information of the time-domain position at which the channel detection succeeds, the target frequency-domain resource range and the MCS information of the transmission region.

In the situation where the system agrees on the preset time-domain resource configuration information, the base station may notify the target UE of the following information through the scheduling instruction: the position at which the channel detection succeeds, the target frequency resource, and the MCS information of the transmission region.

For the second manner, upon reception of the scheduling instruction, the target UE may determine, according to the information of the time-domain position at which the channel detection succeeds and the preset time-domain resource configuration information, the target time-domain resource bearing the data block, and thus acquire the downlink data transmitted by the base station according to the target time-domain resource range, the target frequency-domain resource range, and the MCS information of the transmission region.

A third manner is adaptive to a situation where the base station determines the transmission configuration information of the transmission region according to the second time-domain resource configuration information.

Figure 5:
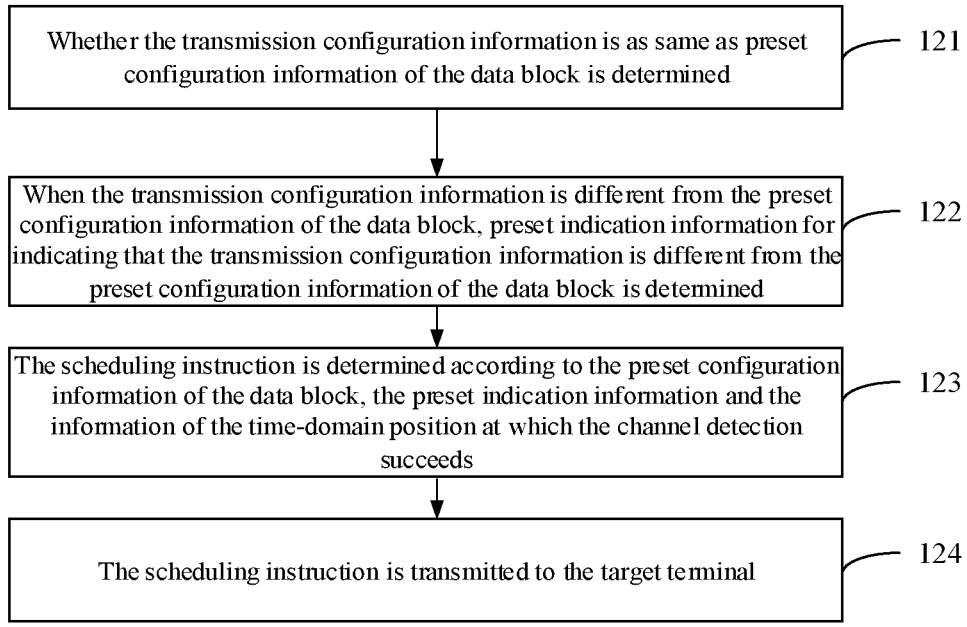
FIG. 5 is a flowchart of another method for transmitting information according to an exemplary embodiment.

FIG. 5 is a flowchart of another method for transmitting information according to an exemplary embodiment. The operation 12 may include the following operations.

In Operation 121, whether the transmission configuration information is as same as preset configuration information of the data block is determined, the preset configuration information of the data block including: a preset time-domain resource quantity, a preset frequency-domain resource quantity and preset MCS information.

In Operation 122, when the transmission configuration information is different from the preset configuration information of the data block, preset indication information for indicating that the transmission configuration information is different from the preset configuration information of the data block is determined.

In the present disclosure, any item of the transmission configuration information of the transmission region may be compared with a corresponding parameter in the preset configuration information of the data block. If different, it may be determined that the transmission configuration information of the transmission region is different from the preset configuration information of the data block.

For example, the quantity of the target time-domain resource may be compared with the preset time-domain resource quantity of the data block; if different, for example, as shown in the embodiments in Table 1 and Table 2, it may be determined that the transmission configuration information of the transmission region is different from the preset configuration information of the data block.

In Operation 123, the scheduling instruction is determined according to the preset configuration information of the data block, the preset indication information and the information of the time-domain position at which the channel detection succeeds.

In the present disclosure, operation 123 may be implemented in two manners.

In a first implementation manner, the preset indication information may be carried by a preset information field in the scheduling information to explicitly indicate that the transmission configuration information of the transmission region is different from the preset configuration information of the data block.

Figure 6:
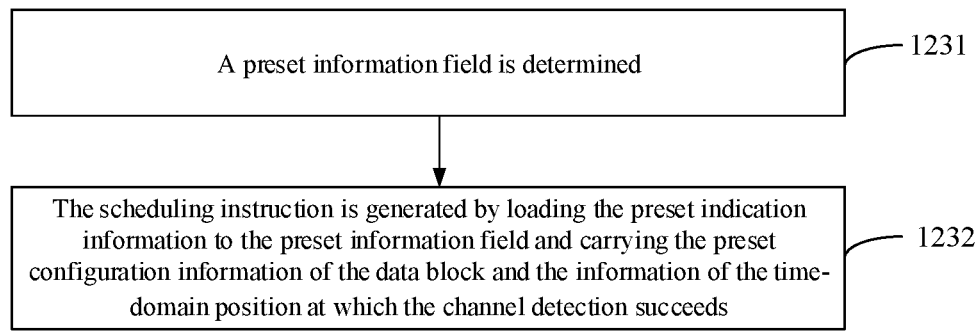
FIG. 6 is a flowchart of another method for transmitting information according to an exemplary embodiment.

FIG. 6 is a flowchart of another method for transmitting information according to an exemplary embodiment. The operation 123 may include the following operations.

In Operation 1231, a preset information field is determined, the preset information field being configured to bear indication information representing whether the transmission configuration information of the transmission region is as same as the preset configuration information of the data block.

In an embodiment of the present disclosure, the system may agree on information of the information field of the scheduling signaling, the information field being configured to carry indication information corresponding to the transmission configuration information. The information of the information field may include: a position of the information field in the scheduling signaling, a size of the information field, and so on.

In another embodiment of the present disclosure, the base station may also configure the information field in real time as required before generating the scheduling signaling, then indicate whether the transmission configuration information of the transmission region is as same as the preset configuration information of the data block through the real-time configured information field, and transmit the configuration information of the information field such as the position and size of the information field to the target UE before transmitting the scheduling signaling. The target UE may determine the configuration information of the information field before receiving the scheduling signaling, such that the target UE may quickly locate the preset information field after receiving the scheduling signaling and analyze whether the transmission configuration information of the transmission region is as same as the preset configuration information of the data block therein.

In Operation 1232, the scheduling instruction is generated by loading the preset indication information to the preset information field and carrying the preset configuration information of the data block and the information of the time-domain position at which the channel detection succeeds.

In the embodiment of the present disclosure, the preset indication information may be loaded to the preset information field of the scheduling instruction, such that the generated scheduling instruction includes the target information field. The target information field carries the preset indication information representing that the transmission configuration information is different from the configuration information of the data block.

In Operation 124, the scheduling instruction is transmitted to the target terminal.

In an embodiment of the present disclosure, when the scheduling instruction determined by the operation 123 only carries the preset configuration information of the data block and the information of the time-domain position at which the channel detection succeeds, the preset indication information may be represented by transmission characteristic information of the scheduling instruction.

Figure 7:
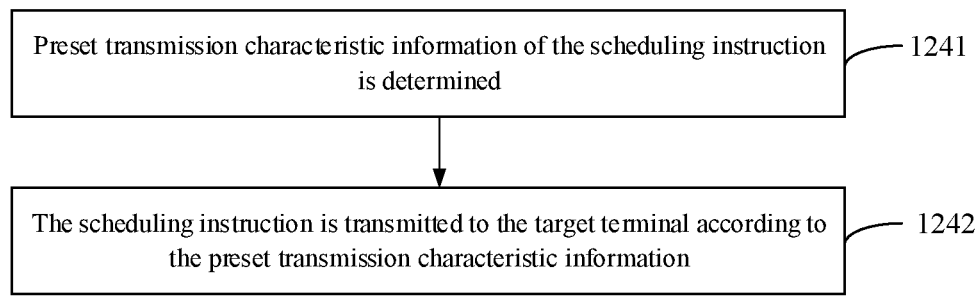
FIG. 7 is a flowchart of another method for transmitting information according to an exemplary embodiment.

Correspondingly, FIG. 7 is a flowchart of another method for transmitting information according to an exemplary embodiment. The operation 124 may include the following operations.

In Operation 1241, preset transmission characteristic information of the scheduling instruction is determined, the preset transmission characteristic information being configured to represent the preset indication information.

In the present disclosure, the preset transmission characteristic information includes at least one of the followings:
a preset transmission position;
a preset DCI format;
a preset RNTI; and
a preset scrambling sequence.

In Operation 1242, the scheduling instruction is transmitted to the target terminal according to the preset transmission characteristic information.

In an example, the preset DCI format is used as an example for description. Based on related knowledge, DCI information configured by the base station for the target UE may include information in different formats. With the assumption that the transmission configuration information of the transmission region is as same as the preset configuration information of the data block, the scheduling instruction may be transmitted to the target UE through format 1 corresponding to DL configuration information.

In the embodiments of the present disclosure, the system may agree that when the scheduling instruction is loaded to DCI information in the preset format such as format 3 for transmission, it is indicated that the transmission configuration information of the transmission region is different from the preset configuration information of the data block, and the base station may transmit the scheduling instruction to the terminal through format 3.

In the present disclosure, the base station may transmit the scheduling instruction, information field configuration information and the like to the target UE through upper signaling or physical layer signaling. The upper signaling may be Radio Resource Control (RRC) signaling, and Medium Access Control (MAC) Control Element (CE) signaling.

In Operation 13, downlink data transmission is performed according to the transmission configuration information based on the preset size of the data block.

The base station performs, after transmitting the scheduling instruction, the downlink data transmission according to the MCS information of the transmission region in the transmission region determined according to the target time-domain resource range and the target frequency-domain resource range.

To sum up, in the embodiments of the present disclosure, a base station may perform transmission configuration on a transmission region according to a preset size of a data block after channel detection succeeds, generate a scheduling instruction according to transmission configuration information of the transmission region, and transmit the scheduling instruction to a target terminal. The target terminal may receive and analyze downlink data transmission bearing the preset size of the data block. In the present disclosure, the base station is adaptive to an idle channel resource of an unlicensed spectrum through the preset size of the data block, and may adaptively configure the transmission configuration information of the transmission region, such that a data volume born on the configured transmission region is equal to a data volume born on the preset data block. Hence, the base station may effectively reduce the transmission unreliability caused by uncertainty of the unlicensed spectrum resource in related art. Therefore, the method for transmitting information provided by the present disclosure may effectively transmit information with an unlicensed spectrum, and improve the reliability of information transmission of the unlicensed spectrum.

Figure 8:
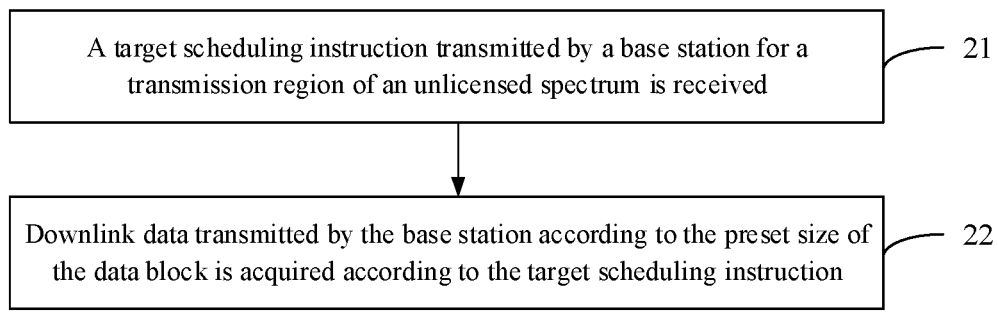
FIG. 8 is a flowchart of a method for transmitting information according to an exemplary embodiment.

Correspondingly, the present disclosure provides a method for transmitting information, which may be implemented by a terminal. FIG. 8 is a flowchart of a method for transmitting information according to an exemplary embodiment. The method may include the following operations.

In Operation 21, a target scheduling instruction transmitted by a base station for a transmission region of an unlicensed spectrum is received, the target scheduling instruction being a scheduling instruction generated by transmission configuration information that is determined by a base station based on a preset size of a data block.

In the present disclosure, whenever receiving the scheduling instruction transmitted by the base station, the terminal may determine whether the scheduling instruction includes related indication information such as time-domain position indication information on success of channel detection, and if the indication information is included, may determine that the present scheduling instruction belongs to the target scheduling instruction.

Or, the terminal may determine, in a case where the present scheduling instruction includes time-frequency range information, whether the present scheduling instruction belongs to the target scheduling instruction according to the time frequency resource information.

In Operation 22, downlink data transmitted by the base station according to the preset size of the data block is acquired according to the target scheduling instruction.

Figure 9:
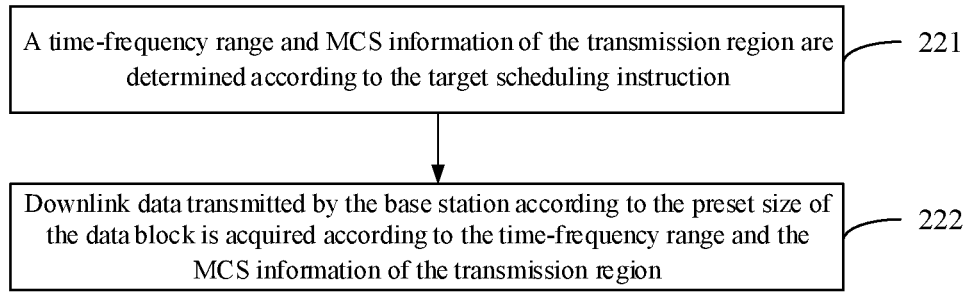
FIG. 9 is a flowchart of another method for transmitting information according to an exemplary embodiment.

FIG. 9 is a flowchart of another method for transmitting information according to an exemplary embodiment. The operation 22 may include the following operation.

In Operation 221, a time-frequency range and MCS information of the transmission region are determined according to the target scheduling instruction.

Corresponding to different manners in which the base station generates the target scheduling instruction based on the preset size of the data block, the operation 221 may include the following implementation manners according to different information carried by the target scheduling instruction.

In a first manner, corresponding to the first manner for the operation 12, the terminal may directly determine the time-frequency range and the MCS information of the transmission region based on the content of the target scheduling instruction.

In a second manner, corresponding to the second manner for the operation 12, the target scheduling instruction may include: information of a time-domain position at which channel detection succeeds, a target frequency-domain resource range and the MCS information of the transmission region.

Figure 10:
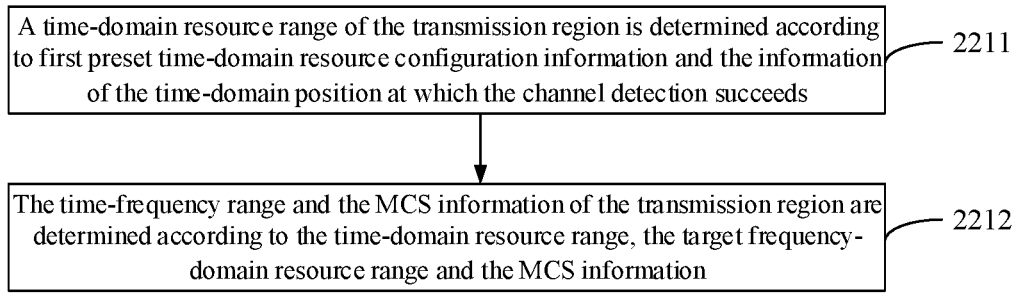
FIG. 10 is a flowchart of another method for transmitting information according to an exemplary embodiment.

FIG. 10 is a flowchart of another method for transmitting information according to an exemplary embodiment. The operation 221 may include the following operations.

In Operation 2211, a time-domain resource range of the transmission region is determined according to first preset time-domain resource configuration information and the information of the time-domain position at which the channel detection succeeds.

The first preset time-domain resource configuration information indicates that after the channel detection succeeds, a preset number of time-domain resource units is determined as target time-domain resources of the transmission region.

In Operation 2212, the time-frequency range and the MCS information of the transmission region are determined according to the time-domain resource range, the target frequency-domain resource range and the MCS information of the transmission region.

In a third manner, corresponding to the third manner for the operation 13, the target scheduling instruction may at least include: preset configuration information of the data block and the information of the time-domain position at which the channel detection succeeds, the preset configuration information of the data block including: a preset time-domain resource quantity, a preset frequency-domain resource quantity and preset MCS information.

Figure 11:
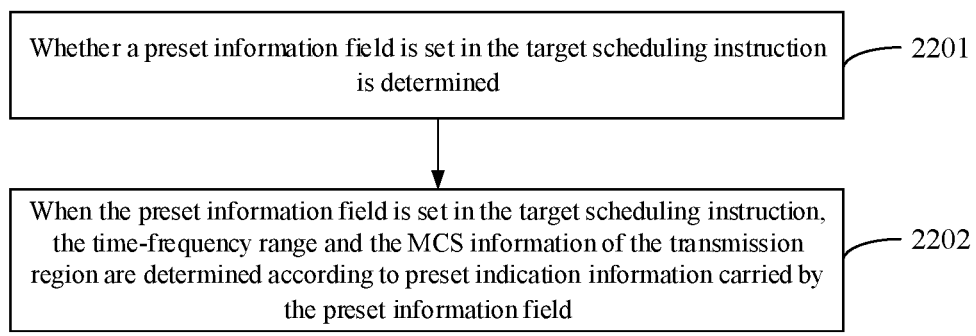
FIG. 11 is a flowchart of another method for transmitting information according to an exemplary embodiment.

FIG. 11 is a flowchart of another method for transmitting information according to an exemplary embodiment. The operation 221 may include the following operations.

In Operation 2201, whether a preset information field is set in the target scheduling instruction is determined, the preset information field indicating whether the transmission configuration information of the transmission region is as same as the preset configuration information of the data block.

In Operation 2202, when the preset information field is set in the target scheduling instruction, the time-frequency range and the MCS information of the transmission region are determined according to preset indication information carried by the preset information field.

Figure 12:
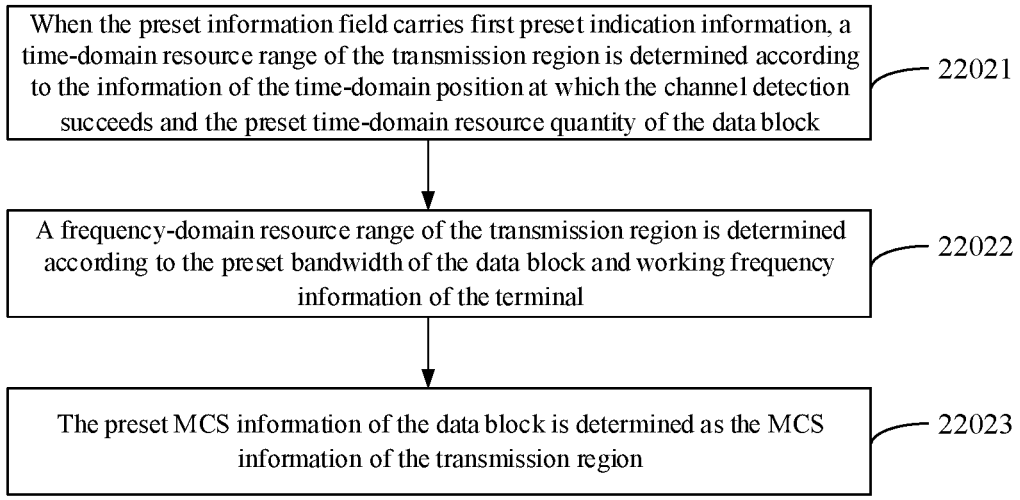
FIG. 12 is a flowchart of a method for transmitting information according to an exemplary embodiment.

The implementation of operation 2202 has two cases:

In a first case, referring to FIG. 12 that is a flowchart of another method for transmitting information according to an exemplary embodiment, the operation 2202 may include the following operations.

In Operation 22021, when the preset information field carries first preset indication information, a time-domain resource range of the transmission region is determined according to the information of the time-domain position at which the channel detection succeeds and the preset time-domain resource quantity of the data block, the first preset indication information indicating that the transmission configuration information of the transmission region is as same as the preset configuration information of the data block.

For example, with the assumption that the information of the time-domain position at which the channel detection succeeds is the 3th symbol in slot 1, when the preset time-domain resource quantity of the data block is 10 symbols and when the system agrees that the time-domain position of the data transmission region is next to the time-domain position at which the channel detection succeeds in the embodiment, the terminal may determine that the time-domain resource range of the transmission region is 4th to 13th symbols of slot 1.

In Operation 22022, a frequency-domain resource range of the transmission region is determined according to the preset frequency-domain resource quantity of the data block and working frequency information of the terminal.

In an example, working frequency information of the terminal may include: a central working frequency of the terminal at the unlicensed spectrum, such as 2100 MHz. With the assumption that the preset frequency-domain resource quantity of the data block is 20 MHz, the terminal may determine, according to the system agreement, that the frequency-domain resource range of the transmission region is 1900 MHz to 2110 MHz.

In Operation 22023, the preset MCS information of the data block is determined as the MCS information of the transmission region.

In an example, as shown in Table 1, with the assumption that the preset MCS information of the data block is QPSK, it is determined that the MCS information of the transmission region is also the QPSK.

Figure 13:
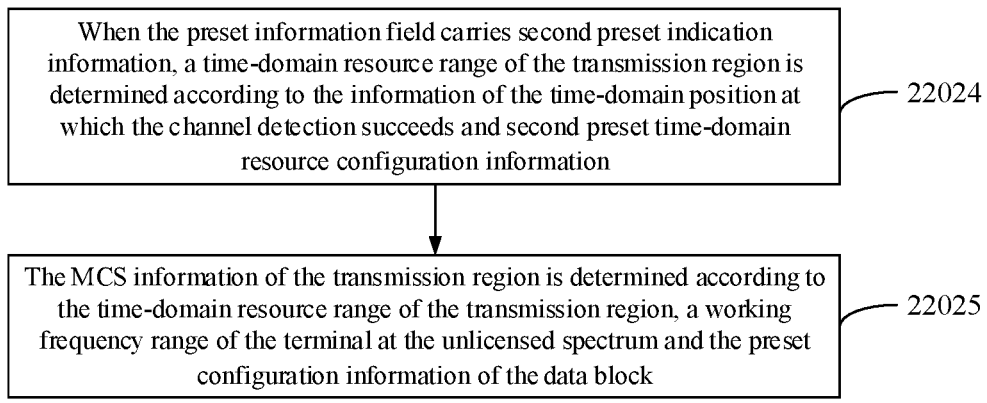
FIG. 13 is a flowchart of another method for transmitting information according to an exemplary embodiment.

In a second case, referring to FIG. 13 that is a flowchart of another method for transmitting information according to an exemplary embodiment, the operation 2202 may include the following operations.

In Operation 22024, when the preset information field carries second preset indication information, a time-domain resource range of the transmission region is determined according to the information of the time-domain position at which the channel detection succeeds and second preset time-domain resource configuration information, the second preset indication information indicating that the transmission configuration information of the transmission region is different from the preset configuration information of the data block.

The second preset time-domain resource configuration information indicates that the base station determines at least one preset remaining time-domain resource in a present data transmission unit where the channel detection succeeds and a preset range of time-domain resources in a subsequent data transmission unit as target time-domain resources bearing the transmission region.

Hereinafter, the case where the preset range of time-domain resources in the subsequent data transmission unit refer to the whole data transmission unit and one data transmission unit is a slot including 14 symbols is used as an example for exemplary description:

with the assumption that the position at which the channel detection of the base station succeeds is the 8th symbol of slot 1, if the system agrees that the time-domain start position of the transmission region is the 2nd symbol after the position where the channel detection succeeds, UE1 may determine the 10th to 13th symbols in slot 1 and corresponding time-domain resources in whole slot 2 as the time-domain resource range of the transmission range.

In Operation 22025, the MCS information of the transmission region is determined according to the time-domain resource range of the transmission region, a working frequency range of the terminal at the unlicensed spectrum and the preset configuration information of the data block.

A rule for determining MCS information is as follows: the size of the transmission region that is determined by the following three parameters, i.e., the time-domain resource range of the transmission region, the working frequency range of the terminal at the unlicensed spectrum and the MCS information of the transmission region, is equal to the size of the preset data block.

In an example, the relationship, which is actually determined by the terminal, between the transmission parameter of the transmission region and the preset configuration information of the data block may be as shown in Table 2.

Figure 14:
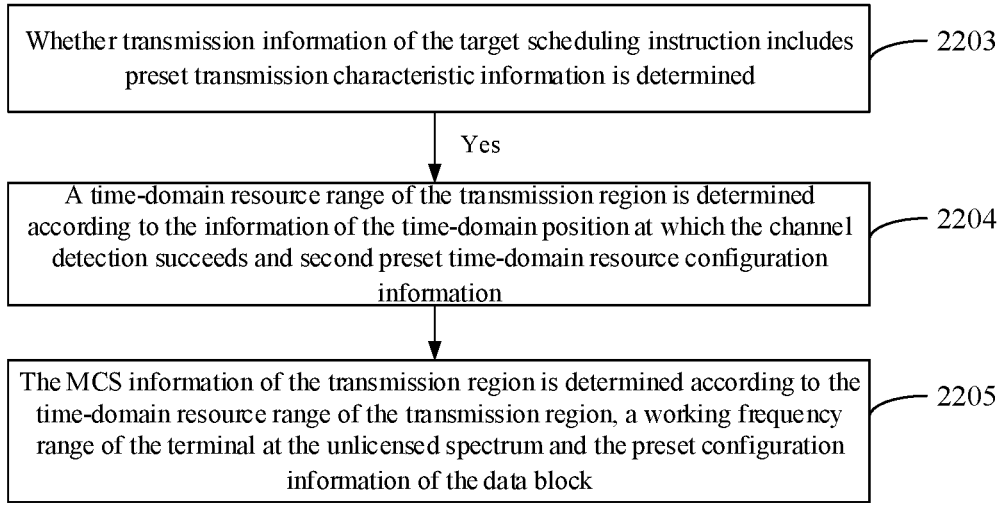
FIG. 14 is a flowchart of another method for transmitting information according to an exemplary embodiment.

FIG. 14 is a flowchart of another method for transmitting information according to an exemplary embodiment. The operation 221 may include the following operations.

In Operation 2203, whether transmission information of the target scheduling instruction includes preset transmission characteristic information is determined, the preset transmission characteristic information indicating that the transmission configuration information of the transmission region is different from the preset configuration information of the data block; the operation 2204 is executed if the preset transmission characteristic information is included; otherwise if no, i.e., the transmission information of the target scheduling instruction does not include the preset transmission characteristic information, the time-frequency range and the MCS information of the transmission region are determined according to the preset configuration information of the data block. The process is similar to the execution process of the operation 22021 to operation 22023 and will not be elaborated herein.

The transmission information of the target scheduling instruction refers to a transmission manner determined for the target scheduling instruction when the terminal acquires the target scheduling instruction, and includes one or more of followings: a transmission position, a DCI format, a RNTI, a scrambling sequence, and the like.

The preset transmission characteristic information may include at least one of the followings:
 a preset transmission position;
 a preset DCI format;
 a preset RNTI; and
 a preset scrambling sequence.

In Operation 2204, when the transmission information of the target scheduling instruction includes the preset transmission characteristic information, a time-domain resource range of the transmission region is determined according to the information of the time-domain position at which the channel detection succeeds and second preset time-domain resource configuration information.

This operation is similar to 22024 and the two may refer to each other, which will not be elaborated herein.

In Operation 2205, the MCS information of the transmission region is determined according to the time-domain resource range of the transmission region, a working frequency range of the terminal at the unlicensed spectrum and the preset configuration information of the data block.

This operation is similar to 22025 and the two may refer to each other, which will not be elaborated herein.

Figure 15:
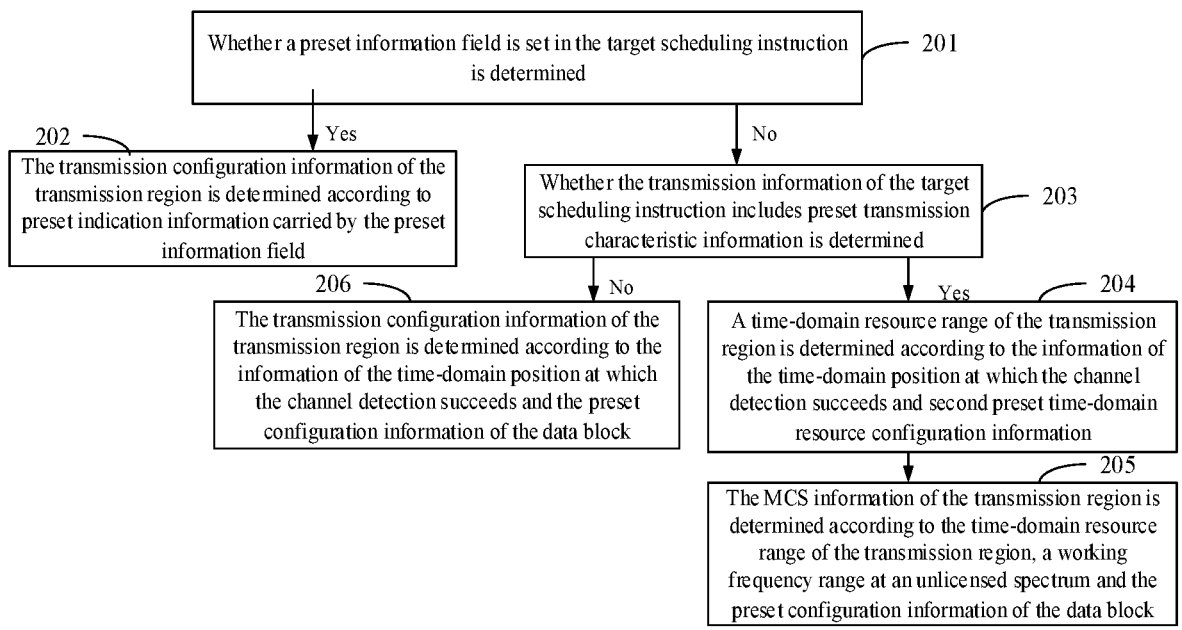
FIG. 15 is a flowchart of another method for transmitting information according to an exemplary embodiment.

In another embodiment of the present disclosure, for the third manner of the operation 12, if the system agrees that the base station may use the target information field or the preset transmission characteristic information to represent that the transmission configuration information of the transmission region is different from the preset configuration information of the preset data block, referring to FIG. 15 that is a flowchart of another method for transmitting information according to an exemplary embodiment, the operation 221 may include the following operations.

In Operation 201, whether a preset information field is set in the target scheduling instruction is determined, the preset information field indicating whether the transmission configuration information of the transmission region is as same as the preset configuration information of the data block.

In Operation 202, when the preset information field is set in the target scheduling instruction, the transmission configuration information of the transmission region is determined according to preset indication information carried by the preset information field.

The implementation manner of the operation 202 may refer to the operation 2202, and will not be elaborated herein.

In Operation 203, when the preset information field is not set in the target scheduling instruction, whether the transmission information of the target scheduling instruction includes preset transmission characteristic information is determined; the operation 204 and the operation 205 are executed if included; and operation 206 is executed if not included.

In Operation 204, when the transmission information of the target scheduling instruction includes the preset transmission characteristic information, a time-domain resource range of the transmission region is determined according to the information of the time-domain position at which the channel detection succeeds and second preset time-domain resource configuration information.

In Operation 205, the MCS information of the transmission region is determined according to the time-domain resource range of the transmission region, a working frequency range at an unlicensed spectrum and the preset configuration information of the data block.

The Operation 204 and operation 205 are respectively as same as the operation 2204 and operation 2205. The execution process may refer to each other.

In Operation 206, when the transmission information of the target scheduling instruction does not include the preset transmission characteristic information, the transmission configuration information of the transmission region is determined according to the information of the time-domain position at which the channel detection succeeds and the preset configuration information of the data block.

The specific execution process of operation 206 may refer to the descriptions on the operation 22021 to operation 22023, and will not be elaborated herein.

In Operation 222, downlink data transmitted by the base station according to the preset size of the data block is acquired according to the time-frequency range and the MCS information of the transmission region.

For simple description, each of the above method embodiments is expressed as a combination of a series of operations, but those skilled in the art should know that the present disclosure is not limited to the described operation sequence because some operations may be executed in other sequences or at the same time according to the present disclosure.

Then, the person skilled in the art should also appreciate that all the embodiments described in the specification are optional embodiments, and the related actions and modules are not necessarily mandatory to the present disclosure.

Corresponding to the above application function realization method embodiment, the present disclosure further provides embodiments on an application function realization device and a corresponding terminal.

Figure 16:
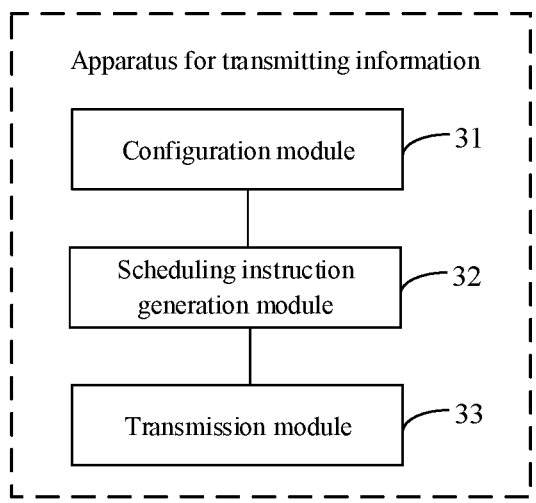
FIG. 16 is a block diagram of another apparatus for transmitting information according to an exemplary embodiment.

Referring to FIG. 16 that is a block diagram of an apparatus for transmitting information according to an exemplary embodiment. The apparatus may be disposed in a base station, and may include: a configuration module 31, a scheduling instruction generation module 32, and a transmission module 33.

The configuration module 31 is configured to determine transmission configuration information of a transmission region based on a preset size of a data block after channel detection on an unlicensed spectrum succeeds, the transmission region being a region bearing downlink data transmission.

The scheduling instruction generation module 32 is configured to generate a scheduling instruction according to the transmission configuration information, and transmit the scheduling instruction to a target terminal.

The transmission module 33 is configured to perform the downlink data transmission according to the transmission configuration information based on the preset size of the data block.

Figure 17:
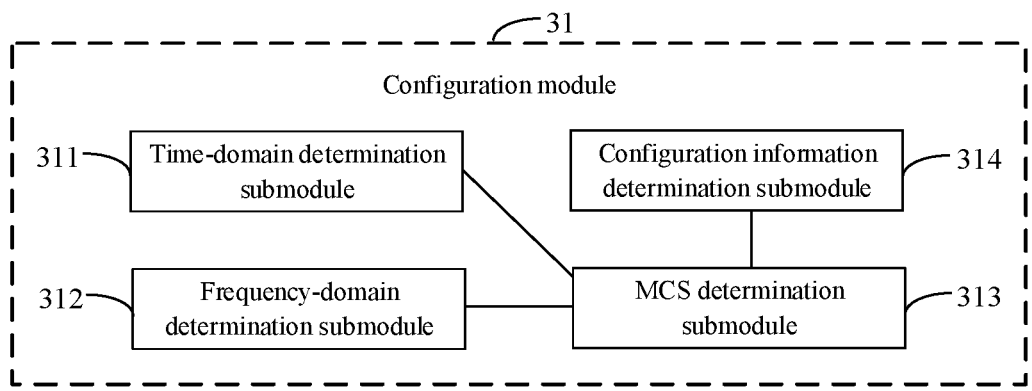
FIG. 17 is a block diagram of another apparatus for transmitting information according to an exemplary embodiment.

FIG. 17 is a block diagram of another apparatus for transmitting information according to an exemplary embodiment. On the basis of the apparatus embodiment shown in FIG. 16, the configuration module 31 may include: a time-domain determination submodule 311, a frequency-domain determination submodule 312, an MCS determination submodule 313, and a configuration information determination submodule 314.

The time-domain determination submodule 311 is configured to determine a target time-domain resource range bearing the data block.

The frequency-domain determination submodule 312 is configured to determine a target frequency-domain resource range bearing the data block.

The MCS determination submodule 313 is configured to determine MCS information of the transmission region according to the target time-domain resource range, the target frequency-domain resource range and the preset size of the data block.

The configuration information determination submodule 314 is configured to determine the transmission configuration information of the transmission region according to the target time-domain resource range, the target frequency-domain resource range and the MCS information.

In an apparatus embodiment of the present disclosure, the time-domain determination submodule 311 may be configured to determine the target time-domain resource range according to preset time-domain resource configuration information.

In an embodiment, the preset time-domain resource configuration information is first preset time-domain resource configuration information, the first preset time-domain resource configuration information indicating that the base station determines the preset number of time-domain resource units as time-domain resources of the transmission region after the channel detection succeeds.

Correspondingly, the time-domain determination submodule 311 may be configured to determine the target time-domain resource range according to the preset number of time-domain resource units after the channel detection succeeds.

In another embodiment, the preset time-domain resource configuration information is second preset time-domain resource configuration information, the second preset time-domain resource configuration information indicating that the base station determines at least one preset remaining time-domain resource in a present data transmission unit where the channel detection succeeds and a preset range of time-domain resources in a subsequent data transmission unit as target time-domain resources of the transmission region.

Figure 18:
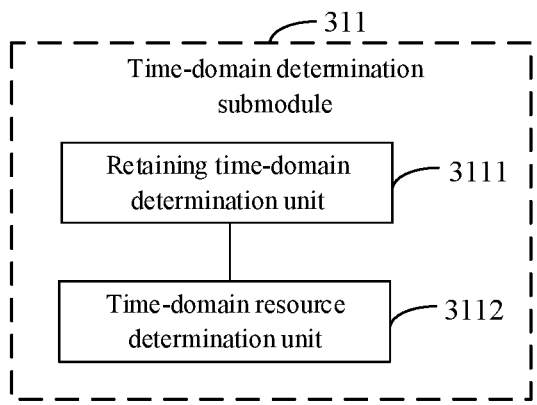
FIG. 18 is a block diagram of another apparatus for transmitting information according to an exemplary embodiment.

FIG. 18 is a block diagram of another apparatus for transmitting information according to an exemplary embodiment. On the basis of the apparatus embodiment shown in FIG. 17, the time-domain determination submodule 311 may include: a remaining time-domain determination unit 3111 and a time-domain resource determination unit 3112.

The remaining time-domain determination unit 3111 is configured to determine, according to the second preset time-domain resource configuration information and according to a time-domain position at which the channel detection succeeds, at least one remaining time-domain resource of the present data transmission unit where the time-domain position is located.

The time-domain resource determination unit 3112 is configured to determine the target time-domain resource range according to the at least one remaining time-domain resource and the preset range of time-domain resources in the subsequent data transmission unit.

In an apparatus embodiment of the present disclosure, the scheduling instruction generation module 32 may be configured to generate the scheduling instruction according to the target time-domain resource range, the target frequency-domain resource range and the MCS information of the transmission region.

In another apparatus embodiment of the present disclosure, the scheduling instruction generation module 32 may be configured to generate the scheduling instruction according to information of a time-domain position at which the channel detection succeeds, the target frequency-domain resource range and the MCS information of the transmission region.

Figure 19:
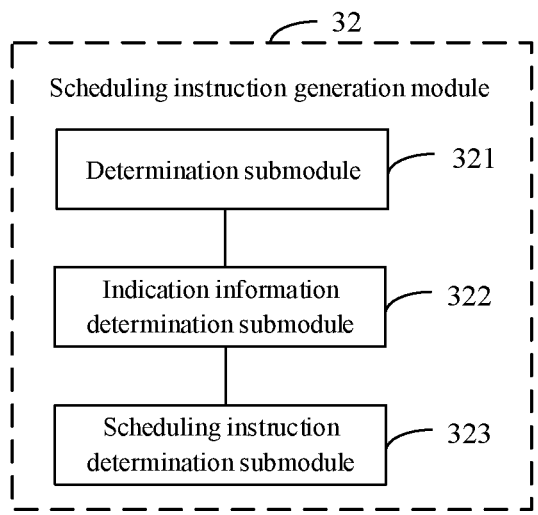
FIG. 19 is a block diagram of another apparatus for transmitting information according to an exemplary embodiment.

Referring to FIG. 19 that is a block diagram of another apparatus for transmitting information according to an exemplary embodiment. The scheduling instruction generation module 32 may include: a determination submodule 321, an indication information determination submodule 322, and a scheduling instruction determination submodule 323.

The determination submodule 321 is configured to determine whether the transmission configuration information is as same as preset configuration information of the data block, the preset configuration information of the data block including: a preset time-domain resource quantity, a preset frequency-domain resource quantity and preset MCS information.

The indication information determination submodule 322 is configured to determine, when the transmission configuration information is different from the preset configuration information of the data block, preset indication information for indicating that the transmission configuration information is different from the preset configuration information of the data block.

The scheduling instruction determination submodule 323 is configured to determine the scheduling instruction according to the preset configuration information of the data block, the preset indication information and the information of the time-domain position at which the channel detection succeeds.

Figure 20:
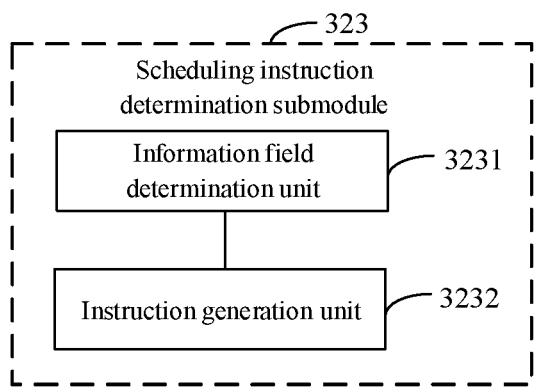
FIG. 20 is a block diagram of another apparatus for transmitting information according to an exemplary embodiment.

FIG. 20 is a block diagram of another apparatus for transmitting information according to an exemplary embodiment. On the basis of the apparatus embodiment shown in FIG. 19, the scheduling instruction determination submodule 323 may include: an information field determination unit 3231, and an instruction generation unit 3232.

The information field determination unit 3231 is configured to determine a preset information field, the preset information field being configured to bear indication information representing whether the transmission configuration information of the transmission region is as same as the preset configuration information of the data block.

The instruction generation unit 3232 is configured to generate the scheduling instruction by loading the preset indication information to the preset information field and carrying the preset configuration information of the data block and the information of the time-domain position at which the channel detection succeeds.

In another apparatus embodiment of the present disclosure, the scheduling instruction may carry the preset configuration information of the data block and the information of the time-domain position at which the channel detection succeeds.

Figure 21:
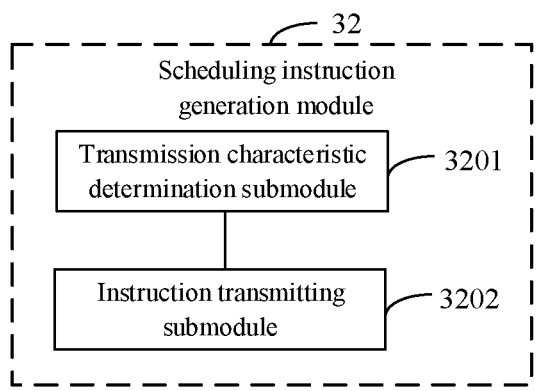
FIG. 21 is a block diagram of another apparatus for transmitting information according to an exemplary embodiment.

FIG. 21 is a block diagram of another apparatus for transmitting information according to an exemplary embodiment. The scheduling instruction generation module 32 may include a transmission characteristic determination submodule 3201 and an instruction transmitting submodule 3202.

The transmission characteristic determination submodule 3201 is configured to determine preset transmission characteristic information of the scheduling instruction, the preset transmission characteristic information being configured to represent the preset indication information.

The instruction transmitting submodule 3202 is configured to transmit the scheduling instruction to the target terminal according to the preset transmission characteristic information.

Correspondingly, the present disclosure further provides an apparatus for transmitting information, which may be disposed in a terminal.

Figure 22:
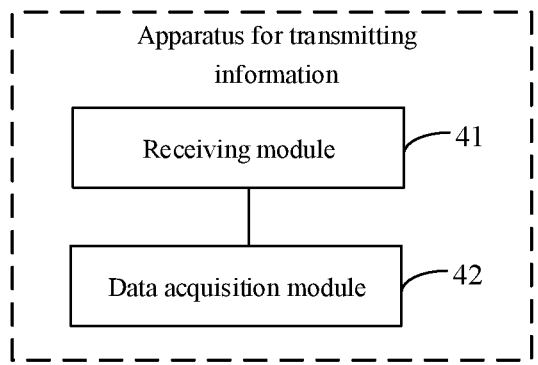
FIG. 22 is a block diagram of an apparatus for transmitting information according to an exemplary embodiment.

Referring to FIG. 22 that is a block diagram of an apparatus for transmitting information according to an exemplary embodiment. The apparatus may be disposed in a terminal, and may include: a receiving module 41, and a data acquisition module 42.

The receiving module 41 is configured to receive a target scheduling instruction transmitted by a base station for a transmission region of an unlicensed spectrum, the target scheduling instruction being a scheduling instruction generated by transmission configuration information that is determined by the base station based on a preset size of a data block.

The data acquisition module 42 is configured to acquire, according to the target scheduling instruction, downlink data transmitted by the base station according to the preset size of the data block.

Figure 23:
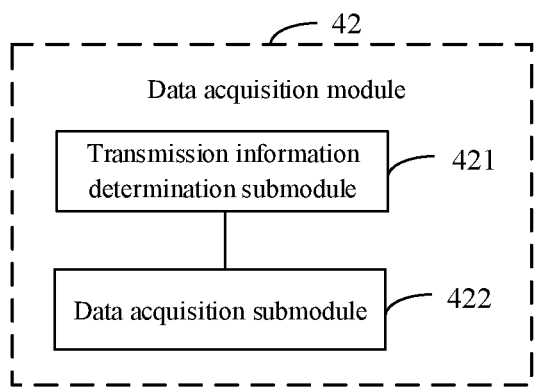
FIG. 23 is a block diagram of another apparatus for transmitting information according to an exemplary embodiment.

FIG. 23 that is a block diagram of another apparatus for transmitting information according to an exemplary embodiment. On the basis of the apparatus embodiment shown in FIG. 22, the data acquisition module 42 may include: a transmission information determination submodule 421, and a data acquisition submodule 422.

The transmission information determination submodule 421 is configured to determine a time-frequency range and MCS information of the transmission region according to the target scheduling instruction.

The data acquisition submodule 422 is configured to acquire, according to the time-frequency range and the MCS information of the transmission region, the downlink data transmitted by the base station according to the preset size of the data block.

In an apparatus embodiment of the present disclosure, the target scheduling instruction may include: information of a time-domain position at which channel detection succeeds, a target frequency-domain resource range of the transmission region and the MCS information of the transmission region.

Figure 24:
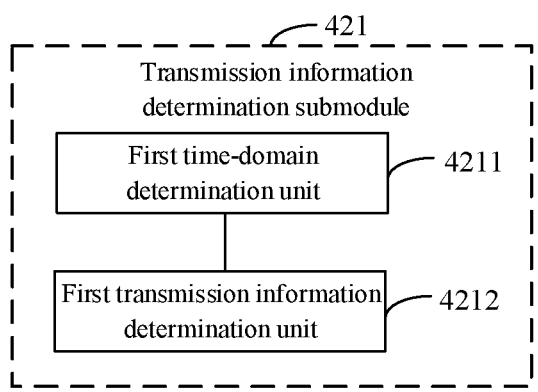
FIG. 24 is a block diagram of another apparatus for transmitting information according to an exemplary embodiment.

FIG. 24 that is a block diagram of another apparatus for transmitting information according to an exemplary embodiment. On the basis of the apparatus embodiment shown in FIG. 23, the transmission information determination submodule 421 may include: a first time-domain determination unit 4211, and a first transmission information determination unit 4212.

The first time-domain determination unit 4211 is configured to determine a time-domain resource range of the transmission region according to first preset time-domain resource configuration information and the information of the time-domain position at which the channel detection succeeds, the first preset time-domain resource configuration information indicating that after the channel detection succeeds, the preset number of time-domain resource units are determined as target time-domain resources bearing the data block.

The first transmission information determination unit 4212 is configured to determine the time-frequency range and the MCS information of the transmission region according to the time-domain resource range, the target frequency-domain resource range and the MCS information.

In another apparatus embodiment of the present disclosure, the target scheduling instruction at least may include: preset configuration information of the data block and information of the time-domain position at which the channel detection succeeds, the preset configuration information of the data block including: a preset time-domain resource quantity, a preset frequency-domain resource quantity and preset MCS information.

Figure 25:
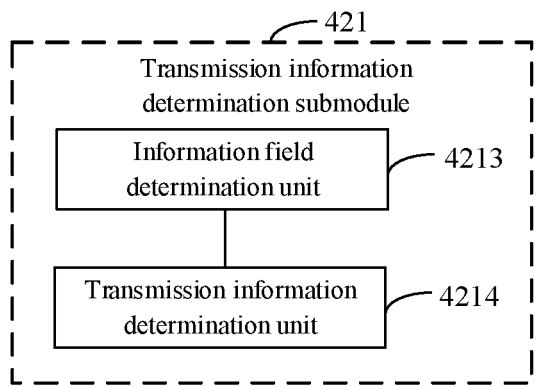
FIG. 25 is a block diagram of another apparatus for transmitting information according to an exemplary embodiment.

FIG. 25 is a block diagram of another apparatus for transmitting information according to an exemplary embodiment. On the basis of the apparatus embodiment shown in FIG. 23, the transmission information determination submodule 421 may include: an information field determination unit 4213, and a transmission information determination unit 4214.

The information field determination unit 4213 is configured to determine whether a preset information field is set in the target scheduling instruction, the preset information field indicating whether the transmission configuration information of the transmission region is as same as the preset configuration information of the data block.

The transmission information determination unit 4214 is configured to determine, when the preset information field is set in the target scheduling instruction, the time-frequency range and the MCS information of the transmission region according to preset indication information carried by the preset information field.

Figure 26:
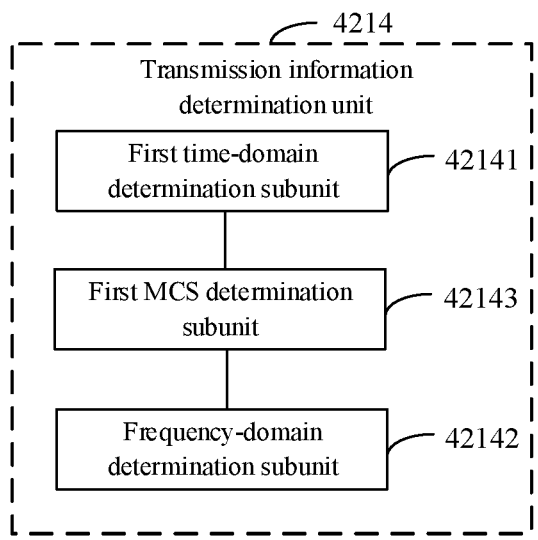
FIG. 26 is a block diagram of another apparatus for transmitting information according to an exemplary embodiment.

FIG. 26 is a block diagram of another apparatus for transmitting information according to an exemplary embodiment. On the basis of the apparatus embodiment shown in FIG. 25, the transmission information determination unit 4214 may include: a first time-domain determination subunit 42141, a frequency-domain determination subunit 42142, and a first MCS determination subunit 42143.

The first time-domain determination subunit 42141 is configured to determine, when the preset information field carries first preset indication information, a time-domain resource range of the transmission region according to the information of the time-domain position at which the channel detection succeeds and the preset time-domain resource quantity of the data block, the first preset indication information indicating that the transmission configuration information of the transmission region is as same as the preset configuration information of the data block.

The frequency-domain determination subunit 42142 is configured to determine a frequency-domain resource range of the transmission region according to the preset frequency-domain resource quantity of the data block and working frequency information of the terminal.

The first MCS determination subunit 42143 is configured to determine the preset MCS information of the data block as the MCS information of the transmission region.

Figure 27:
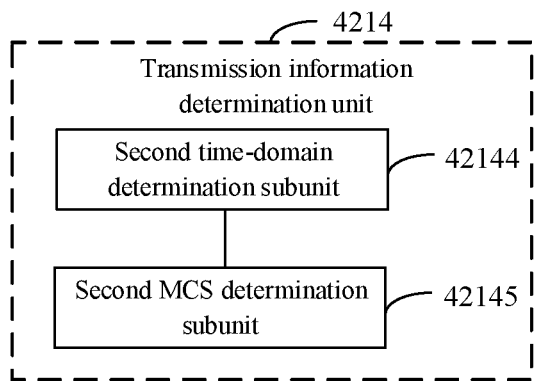
FIG. 27 is a block diagram of another apparatus for transmitting information according to an exemplary embodiment.

FIG. 27 is a block diagram of another apparatus for transmitting information according to an exemplary embodiment. On the basis of the apparatus embodiment shown in FIG. 25, the transmission information determination unit 4214 may include: a second time-domain determination subunit 42144, and a second MCS determination subunit 42145.

The second time-domain determination subunit 42144 is configured to determine, when the preset information field carries second preset indication information, a time-domain resource range of the transmission region according to the information of the time-domain position at which the channel detection succeeds and second preset time-domain resource configuration information.

The second MCS determination subunit 42145 is configured to determine the MCS information of the transmission region according to the time-domain resource range of the transmission region, a working frequency range of the terminal at the unlicensed spectrum and the preset configuration information of the data block.

The second preset indication information indicates that the transmission configuration information of the transmission region is different from the preset configuration information of the data block.

The second preset time-domain resource configuration information indicates that the base station determines at least one preset remaining time-domain resource in a present data transmission unit where the channel detection succeeds and a preset range of time-domain resources in a subsequent data transmission unit as target time-domain resources bearing the transmission region.

In an apparatus embodiment of the present disclosure, the target scheduling instruction at least may include: preset configuration information of the data block and the information of the time-domain position at which the channel detection succeeds, the preset configuration information of the data block including: a preset time-domain resource quantity, a preset frequency-domain resource quantity and preset MCS information.

Figure 28:
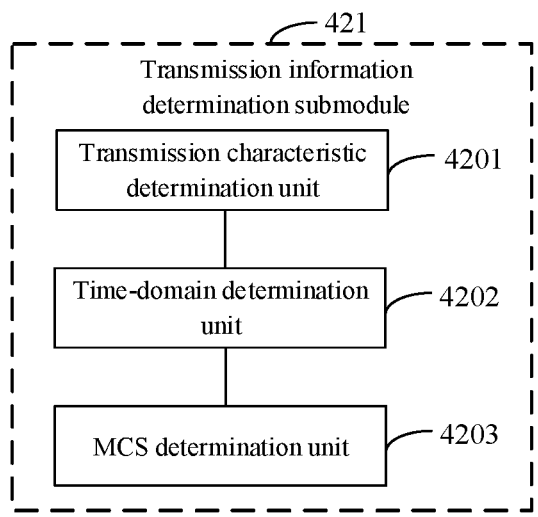
FIG. 28 is a block diagram of another apparatus for transmitting information according to an exemplary embodiment.

FIG. 28 is a block diagram of another apparatus for transmitting information according to an exemplary embodiment. On the basis of the apparatus embodiment shown in FIG. 23, the transmission information determination submodule 421 may include: a transmission characteristic determination unit 4201, a time-domain determination unit 4202 and an MCS determination unit 4203.

The transmission characteristic determination unit 4201 is configured to determine whether transmission information of the target scheduling instruction includes preset transmission characteristic information, the preset transmission characteristic information indicating that the transmission configuration information of the transmission region is different from the preset configuration information of the data block.

The time-domain determination unit 4202 is configured to determine, when the transmission information of the target scheduling instruction includes the preset transmission characteristic information, a time-domain resource range of the transmission region according to the information of the time-domain position at which the channel detection succeeds and second preset time-domain resource configuration information.

The preset transmission characteristic information may include at least one of the followings:
a preset transmission position;
a preset DCI format;
a preset RNTI; and
a preset scrambling sequence.

The MCS determination unit 4203 is configured to determine the MCS information of the transmission region according to the time-domain resource range of the transmission region, a working frequency range of the terminal at the unlicensed spectrum and the preset configuration information of the data block.

The second preset time-domain resource configuration information indicates that the base station determines at least one preset remaining time-domain resource in a present data transmission unit where the channel detection succeeds and a preset range of time-domain resources in a subsequent data transmission unit as target time-domain resources of the transmission region.

The apparatus embodiments are basically corresponding to the method embodiments, so relevant parts may be referred to the description in the method embodiments. The above described apparatus embodiments are merely schematic. The units described as separate parts may or may not be physically separate, and parts displayed as units may or may not be physical units, which may be located in one position, or may be distributed on a plurality of network units. Some or all of the modules may be selected according to actual needs to achieve the objectives of the solutions of the present disclosure. Those of ordinary skill in the art may understand and implement the present disclosure without creative work.

Correspondingly, according to an aspect, a base station is provided, which may include:

a processor; and memory storing instructions executable by the processor. The processor is configured to:

determine transmission configuration information of a transmission region based on a preset size of a data block after channel detection on an unlicensed spectrum succeeds, the transmission region being a region bearing downlink data transmission;

generate a scheduling instruction according to the transmission configuration information, and transmit the scheduling instruction to a target terminal; and perform the downlink data transmission according to the transmission configuration information based on the preset size of the data block.

According to another aspect, a terminal is provided, which may include:

a processor; and memory storing instructions executable by the processor. The processor is configured to:

receive a target scheduling instruction transmitted by a base station for a transmission region of an unlicensed spectrum, the target scheduling instruction being a scheduling instruction generated by transmission configuration information that is determined by the base station based on a preset size of a data block; and acquire, according to the target scheduling instruction, downlink data transmitted by the base station according to the preset size of the data block.

Figure 29:
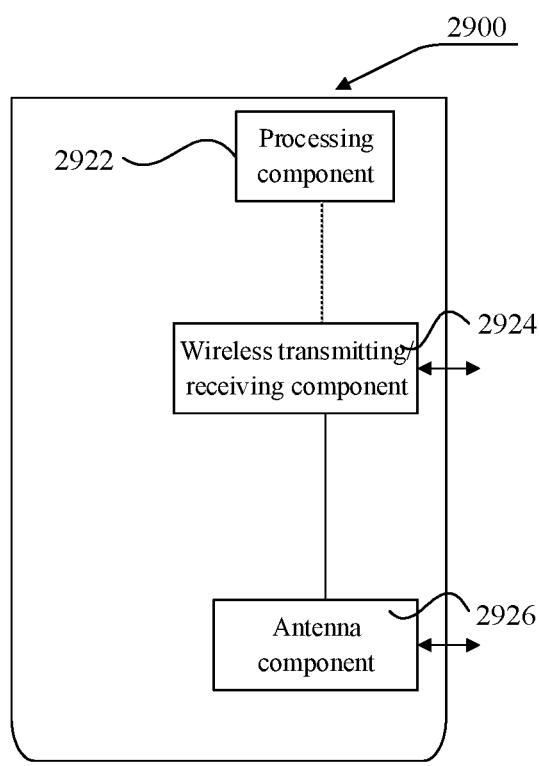
FIG. 29 is a schematic structural diagram of a base station according to an exemplary embodiment.

As shown in FIG. 29, FIG. 29 is a schematic structural diagram of a base station 2900 according to an exemplary embodiment. Referring to FIG. 29, the base station 2900 includes a processing component 2922, a wireless transmitting/receiving component 2924, an antenna component 2929, and a signal processing portion special for a wireless interface. The processing component 2922 may further include one or more processors.

One processor in the processing component 2922 may be configured to:

determine transmission configuration information of a transmission region based on a preset size of a data block after channel detection on an unlicensed spectrum succeeds, the transmission region being a region bearing downlink data transmission;

generate a scheduling instruction according to the transmission configuration information, and transmit the scheduling instruction to a target terminal; and perform the downlink data transmission according to the transmission configuration information based on the preset size of the data block. In an exemplary embodiment, a non-temporary computer-readable storage medium including instructions is further provided, which stores computer instructions therein. The computer instructions may be executed by the processing component 2922 of the base station 2900 to complete the method for transmitting information as shown in FIG. 1 to FIG. 7. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

Figure 30:
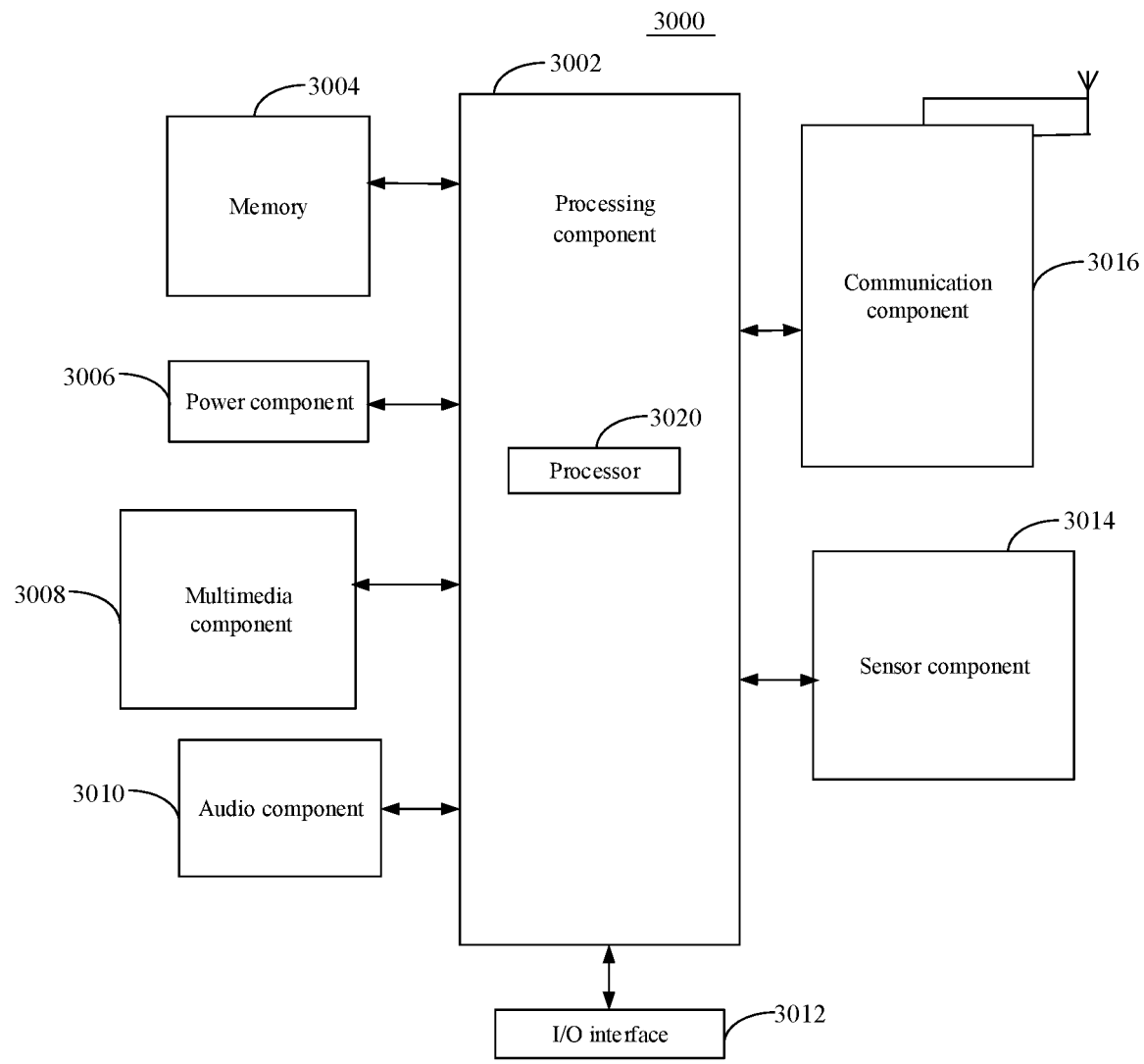
FIG. 30 is a schematic structural diagram of a terminal according to an exemplary embodiment.

FIG. 30 illustrates a schematic structural diagram of a terminal 3000 according to an exemplary embodiment. For example, the terminal 3000 may be UE, and may specifically a mobile phone, a computer, a digital broadcast terminal, a messaging device, a gaming console, a tablet, a medical device, exercise equipment, a Personal Digital Assistant (PDA), a wearable device such as a smartwatch, smart glasses, a smart bracelet, smart running shoes, and the like.

Referring to FIG. 30, the terminal 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the terminal 3000, such as the operations associated with display, telephone calls, data communications, camera operations, and recording operations. The processing component 3002 may include one or more processors 3020 to execute instructions to perform all or part of the operations in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the terminal 3000. Examples of such data include instructions for any application or method operated on the terminal 3000, contact data, phonebook data, messages, pictures, videos, etc. The memory 3004 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 3006 provides power to various components of the terminal 3000. The power component 3006 may include a power management system, one or more power sources, and any other components associated with the generation, management, and distribution of power in the terminal 3000.

The multimedia component 3008 includes a screen providing an output interface between the terminal 3000 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 3008 includes a front camera and/or a rear camera. The front camera and/or the rear camera may receive external multimedia data when the apparatus 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the terminal 3000 is in an operation mode, such as a call mode, a recording mode, and a voice recognition mode. The received audio signal may further be stored in the memory 3004 or transmitted via the communication component 3016. In some embodiments, the audio component 3010 further includes a speaker configured to output audio signals.

The I/O interface 3012 provides an interface between the processing component 3002 and peripheral interface modules. The peripheral interface modules may be a keyboard, a click wheel, buttons, and the like. The buttons may include, but are not limited to, a home button, a volume button, a starting button, and a locking button.

The sensor component 3014 includes one or more sensors to provide status assessments of various aspects of the terminal 3000. For instance, the sensor component 3014 may detect an on/off status of the device 3000 and relative positioning of components, such as a display and small keyboard of the terminal 3000, and the sensor component 3014 may further detect a change in a position of the terminal 3000 or a component of the terminal 3000, presence or absence of contact between the user and the terminal 3000, orientation or acceleration/deceleration of the terminal 3000 and a change in temperature of the terminal 3000. The sensor component 3014 may include a proximity sensor, configured to detect the presence of nearby objects without any physical contact. The sensor component 3014 may also include a light sensor, such as a Complementary Metal Oxide Semiconductor (CMOS) or Charge Coupled Device (CCD) image sensor, configured for use in an imaging application. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the terminal 3000 and other devices. The terminal 3000 may access a wireless network based on a communication standard, such as WiFi, 2G, 3G, 4G LTE, or a combination thereof. In one exemplary embodiment, the communication component 3016 receives a broadcast signal or broadcast associated information from an external broadcast management system via a broadcast channel. In an exemplary embodiment, the communication component 3016 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In an exemplary embodiment, the terminal 3000 may be implemented with one or more Application Specific Integrated Circuits (ASIC), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-temporary computer readable storage medium including an instruction is further provided, for example, the memory 3004 including the instruction; and the instruction may be executed by the processor 3020 of the terminal 3000 to complete the method for transmitting the information shown in FIG. 8 to FIG. 15. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting information, implemented by a base station and comprising:
   determining transmission configuration information of a transmission region based on a preset size of a data block after channel detection on an unlicensed spectrum succeeds, the transmission region being a region bearing downlink data transmission;
   generating a scheduling instruction according to the transmission configuration information, and transmitting the scheduling instruction to a target terminal; and
   performing the downlink data transmission according to the transmission configuration information based on the preset size of the data block,
   wherein determining the transmission configuration information of the transmission region based on the preset size of the data block comprises:
   determining a target time-domain resource range bearing the data block;
   determining a target frequency-domain resource range bearing the data block;
   determining Modulation and Coding Scheme (MCS) information of the transmission region according to the target time-domain resource range, the target frequency-domain resource range and the preset size of the data block; and
   determining the transmission configuration information of the transmission region according to the target time-domain resource range, the target frequency-domain resource range and the MCS information,
   wherein performing the downlink data transmission according to the transmission configuration information based on the preset size of the data block comprises:

transmitting the downlink data according to the target time-domain resource range, the target frequency-domain resource range and the MCS information of the transmission region to the target terminal according to the preset size of the data block,
wherein the scheduling instruction at least comprises: preset configuration information of the data block and information of a time-domain position at which channel detection succeeds;
wherein the preset configuration information of the data block comprises: a preset time-domain resource quantity, a preset frequency-domain resource quantity and preset MCS information;
wherein in a case that transmission information of the scheduling instruction comprises preset transmission characteristic information configured to indicate that the transmission configuration information of the transmission region is different from the preset configuration information of the data block, the target time-domain resource range of the transmission region is determined according to the information of the time-domain position at which the channel detection succeeds and second preset time-domain resource configuration information, and the MCS information of the transmission region is determined according to the target time-domain resource range of the transmission region, a working frequency range of the target terminal at the unlicensed spectrum and the preset configuration information of the data block,
wherein the second preset time-domain resource configuration information indicates that the base station determines at least one preset remaining time-domain resource in a present data transmission unit where the channel detection succeeds and a preset range of time-domain resources in a subsequent data transmission unit as target time-domain resources of the transmission region.

2. The method of claim 1, wherein determining the target time-domain resource range bearing the data block comprises:
determining the target time-domain resource range according to preset time-domain resource configuration information.

3. The method of claim 2, wherein the preset time-domain resource configuration information is first preset time-domain resource configuration information, the first preset time-domain resource configuration information indicating that the base station determines a preset number of time-domain resource units as time-domain resources of the transmission region after the channel detection succeeds;
wherein determining the target time-domain resource range according to the preset time-domain resource configuration information comprises:
determining the target time-domain resource range according to the preset number of time-domain resource units after the channel detection succeeds.

4. The method of claim 2, wherein the preset time-domain resource configuration information is the second preset time-domain resource configuration information,
wherein determining the target time-domain resource range according to the preset time-domain resource configuration information comprises:
determining, according to the second preset time-domain resource configuration information and according to the time-domain position at which the channel detection succeeds, remaining time-domain resources of the present data transmission unit where the time-domain position is located; and
determining the target time-domain resource range according to the remaining time-domain resources and the preset range of time-domain resources in the subsequent data transmission unit.

5. The method of claim 1, wherein generating the scheduling instruction according to the transmission configuration information comprises:
generating the scheduling instruction according to the target time-domain resource range, the target frequency-domain resource range and the MCS information of the transmission region.

6. The method of claim 2, wherein generating the scheduling instruction according to the transmission configuration information comprises:
generating the scheduling instruction according to the information of the time-domain position at which the channel detection succeeds, the target frequency-domain resource range and the MCS information of the transmission region.

7. The method of claim 2, wherein generating the scheduling instruction according to the transmission configuration information comprises:
determining whether the transmission configuration information is as same as the preset configuration information of the data block;
determining, when the transmission configuration information is different from the preset configuration information of the data block, preset indication information for indicating that the transmission configuration information is different from the preset configuration information of the data block; and
determining the scheduling instruction according to the preset configuration information of the data block, the preset indication information and the information of the time-domain position at which the channel detection succeeds.

8. The method of claim 7, wherein determining the scheduling instruction according to the preset configuration information of the data block, the preset indication information and the information of the time-domain position at which the channel detection succeeds comprises:
determining a preset information field, the preset information field being configured to bear indication information representing whether the transmission configuration information of the transmission region is as same as the preset configuration information of the data block; and
generating the scheduling instruction by loading the preset indication information to the preset information field, and carrying the preset configuration information of the data block and the information of the time-domain position at which the channel detection succeeds.

9. The method of claim 7, wherein the scheduling instruction carries the preset configuration information of the data block and the information of the time-domain position at which the channel detection succeeds;
wherein transmitting the scheduling instruction to the target terminal comprises:
determining the preset transmission characteristic information of the scheduling instruction, the preset transmission characteristic information being configured to represent the preset indication information; and transmitting the scheduling instruction to the target terminal according to the preset transmission characteristic information.

10. A base station, comprising:
at least one processor; and
memory storing instructions executable by the at least one processor,
wherein the at least one processor is configured to run the instructions to implement operations of the method of claim 1.

11. A method for transmitting information, implemented by a terminal and comprising:
receiving a target scheduling instruction transmitted by a base station for a transmission region of an unlicensed spectrum, the target scheduling instruction being a scheduling instruction generated by transmission configuration information that is determined by the base station based on a preset size of a data block; and
acquiring, according to the target scheduling instruction, downlink data transmitted by the base station according to the preset size of the data block,
wherein acquiring, according to the target scheduling instruction, the downlink data transmitted by the base station according to the preset size of the data block comprises:
determining a time-frequency range and Modulation and Coding Scheme (MCS) information of the transmission region according to the target scheduling instruction; and
acquiring, according to the time-frequency range and the MCS information of the transmission region, the downlink data transmitted by the base station according to the preset size of the data block,
wherein the target scheduling instruction at least comprises: preset configuration information of the data block and information of a time-domain position at which channel detection succeeds;
wherein the preset configuration information of the data block comprises: a preset time-domain resource quantity, a preset frequency-domain resource quantity and preset MCS information;
wherein determining the time-frequency range and the MCS information of the transmission region according to the target scheduling instruction comprises:
determining whether transmission information of the target scheduling instruction comprises preset transmission characteristic information, the preset transmission characteristic information indicating that the transmission configuration information of the transmission region is different from the preset configuration information of the data block;
determining, when the transmission information of the target scheduling instruction comprises the preset transmission characteristic information, a time-domain resource range of the transmission region according to the information of the time-domain position at which the channel detection succeeds and second preset time-domain resource configuration information; and
determining the MCS information of the transmission region according to the time-domain resource range of the transmission region, a working frequency range of the terminal at the unlicensed spectrum and the preset configuration information of the data block,
wherein the second preset time-domain resource configuration information indicates that the base station determines at least one preset remaining time-domain resource in a present data transmission unit where the channel detection succeeds and a preset range of time-domain resources in a subsequent data transmission unit as target time-domain resources of the transmission region.

12. The method of claim 1, wherein the target scheduling instruction comprises: a target frequency-domain resource range of the transmission region and the MCS information of the transmission region;
wherein determining the time-frequency range and the MCS information of the transmission region according to the target scheduling instruction comprises:
determining a time-domain resource range of the transmission region according to first preset time-domain resource configuration information and the information of the time-domain position at which the channel detection succeeds, the first preset time-domain resource configuration information indicating that after the channel detection succeeds, a preset number of time-domain resource units are determined as target time-domain resources bearing the data block; and
determining the time-frequency range and the MCS information of the transmission region according to the time-domain resource range, the target frequency-domain resource range and the MCS information of the transmission region.

13. The method of claim 1,
wherein determining the time-frequency range and the MCS information of the transmission region according to the target scheduling instruction comprises:
determining whether a preset information field is set in the target scheduling instruction, the preset information field indicating whether the transmission configuration information of the transmission region is as same as the preset configuration information of the data block; and
determining, when the preset information field is set in the target scheduling instruction, the time-frequency range and the MCS information of the transmission region according to preset indication information carried by the preset information field.

14. The method of claim 13, wherein determining the time-frequency range and the MCS information of the transmission region according to the preset indication information carried by the preset information field comprises:
determining, when the preset information field carries first preset indication information, a time-domain resource range of the transmission region according to the information of the time-domain position at which the channel detection succeeds and the preset time-domain resource quantity of the data block, the first preset indication information indicating that the transmission configuration information of the transmission region is as same as the preset configuration information of the data block;
determining a frequency-domain resource range of the transmission region according to the preset frequency-domain resource quantity of the data block and working frequency information of the terminal; and
determining the preset MCS information of the data block as the MCS information of the transmission region.

15. The method of claim 13, wherein determining the time-frequency range and the MCS information of the transmission region according to the preset indication information carried by the preset information field comprises:

determining, when the preset information field carries second preset indication information, a time-domain resource range of the transmission region according to the information of the time-domain position at which the channel detection succeeds and second preset time-domain resource configuration information; and determining the MCS information of the transmission region according to the time-domain resource range of the transmission region, a working frequency range of the terminal at the unlicensed spectrum and the preset configuration information of the data block, wherein the second preset indication information indicates that the transmission configuration information of the transmission region is different from the preset configuration information of the data block; and the second preset time-domain resource configuration information indicates that the base station determines at least one preset remaining time-domain resource in a present data transmission unit where the channel detection succeeds and a preset range of time-domain resources in a subsequent data transmission unit as target time-domain resources bearing the transmission region.

16. The method of claim 11, wherein the preset transmission characteristic information comprises at least one of following parameters:
a preset transmission position;
a preset Downlink Control Information (DCI) format;
a preset Radio Network Temporary Identity (RNTI); and
a preset scrambling sequence.

17. A terminal, comprising:
at least one processor; and
memory storing instructions executable by the at least one processor,
wherein the at least one processor is configured to:
receive a target scheduling instruction transmitted by a base station for a transmission region of an unlicensed spectrum, the target scheduling instruction being a scheduling instruction generated by transmission configuration information that is determined by the base station based on a preset size of a data block; and
acquire, according to the target scheduling instruction, downlink data transmitted by the base station according to the preset size of the data block,
wherein acquire, according to the target scheduling instruction, the downlink data transmitted by the base station according to the preset size of the data block comprises the processor being configured to perform following acts:

determining a time-frequency range and Modulation and Coding Scheme (MCS) information of the transmission region according to the target scheduling instruction; and acquiring, according to the time-frequency range and the MCS information of the transmission region, the downlink data transmitted by the base station according to the preset size of the data block, wherein the target scheduling instruction at least comprises: preset configuration information of the data block and information of a time-domain position at which channel detection succeeds;

wherein the preset configuration information of the data block comprises: a preset time-domain resource quantity, a preset frequency-domain resource quantity and preset MCS information;

wherein determining the time-frequency range and the MCS information of the transmission region according to the target scheduling instruction comprises:
determining whether transmission information of the target scheduling instruction comprises preset transmission characteristic information, the preset transmission characteristic information indicating that the transmission configuration information of the transmission region is different from the preset configuration information of the data block;

determining, when the transmission information of the target scheduling instruction comprises the preset transmission characteristic information, a time-domain resource range of the transmission region according to the information of the time-domain position at which the channel detection succeeds and second preset time-domain resource configuration information; and determining the MCS information of the transmission region according to the time-domain resource range of the transmission region, a working frequency range of the terminal at the unlicensed spectrum and the preset configuration information of the data block, wherein the second preset time-domain resource configuration information indicates that the base station determines at least one preset remaining time-domain resource in a present data transmission unit where the channel detection succeeds and a preset range of time-domain resources in a subsequent data transmission unit as target time-domain resources of the transmission region.

* * * * *